(12) United States Patent
Ye et al.

(10) Patent No.: US 11,552,774 B2
(45) Date of Patent: *Jan. 10, 2023

(54) INDICATION TECHNIQUES FOR NARROWBAND SYSTEM INFORMATION BLOCK TYPE 1 (SIB1-NB) TRANSMISSION ON A CARRIER

(71) Applicant: Apple Inc., Cupertino, CA (US)

(72) Inventors: Qiaoyang Ye, Fremont, CA (US); Debdeep Chatterjee, San Jose, CA (US)

(73) Assignee: Apple Inc., Cupertino, CA (US)

( * ) Notice: Subject to any disclaimer, the term of this patent is extended or adjusted under 35 U.S.C. 154(b) by 269 days.

This patent is subject to a terminal disclaimer.

(21) Appl. No.: 16/273,566

(22) Filed: Feb. 12, 2019

(65) Prior Publication Data
US 2019/0190686 A1   Jun. 20, 2019

Related U.S. Application Data

(60) Provisional application No. 62/669,784, filed on May 10, 2018, provisional application No. 62/710,328, filed on Feb. 16, 2018.

(51) Int. Cl.
*H04L 5/14* (2006.01)
*H04L 5/00* (2006.01)
*H04L 27/26* (2006.01)

(52) U.S. Cl.
CPC ............ *H04L 5/1469* (2013.01); *H04L 5/001* (2013.01); *H04L 5/0096* (2013.01); *H04L 27/2666* (2013.01); *H04L 27/2602* (2013.01)

(58) Field of Classification Search
CPC . H04L 5/0096; H04L 5/1469; H04L 5/00137; H04L 27/2602; H04L 27/2666
See application file for complete search history.

(56) References Cited

U.S. PATENT DOCUMENTS

| | | | |
|---|---|---|---|
| 2019/0253231 A1* | 8/2019 | Park | H04L 5/1469 |
| 2019/0372696 A1* | 12/2019 | Park | H04J 11/005 |
| 2020/0067690 A1* | 2/2020 | Park | H04L 5/0053 |
| 2020/0396722 A1* | 12/2020 | Han | H04L 5/143 |

OTHER PUBLICATIONS

U.S. Appl. No. 62/547,768, filed Aug. 2017, Park; Changhwan.*
U.S. Appl. No. 62/464,384, filed Feb. 2017, Park; Changhwan.*
Huawei et al., "New WID on Further NB-IoT enhancements," #3GPP TSG RAN Meeting #75, RP-170852, Agenda Item: 10.1.1, Mar. 6-9, 2017, Dubrovnik, Croatia, 6 pages.
3GPP, "Technical Specification Group Radio Access Network; Evolved Universal Terrestrial Radio Access (E-UTRA); Radio Resource Control (RRC); Protocol specification (Release 15)," 3GPP TS 36.331 V15.0.1 (Jan. 2018), Lte Advanced Pro, 776 pages.

(Continued)

*Primary Examiner* — Jianye Wu
(74) *Attorney, Agent, or Firm* — Sterne, Kessler, Goldstein & Fox P.L.L.C.

(57) ABSTRACT

Embodiments described herein relate to time division duplexing (TDD) support for in-band, guard band, and standalone operation modes of narrowband internet-of-things (NB-IoT) systems. At least one example is directed to an indication technique for transmission of a narrowband system information block type 1 (SIB1-NB) on a carrier.

25 Claims, 16 Drawing Sheets

(56) References Cited

OTHER PUBLICATIONS

3GPP, "Technical Specification Group Radio Access Network; Evolved Universal Terrestrial Radio Access (E-UTRA) Physical layer procedures (Release 15)," 3GPP TS 36.213 V15.0.0 (Dec. 2017), 5G, 493 pages.

3GPP, "Evolved Universal Terrestrial Radio Access (E-UTRA); Physical channels and modulation (Release 15)," 3GPP TS 36.211 V15.0.0 (Dec. 2017), 5G, 219 pages.

\* cited by examiner

INDICATION TECHNIQUES FOR NARROWBAND SYSTEM INFORMATION BLOCK TYPE 1 (SIB1-NB) TRANSMISSION ON A CARRIER

RELATED APPLICATIONS

This application claims priority to U.S. Provisional Application No. 62/710,328, filed Feb. 16, 2018 and to U.S. Provisional Application No. 62/669,784, filed May 10, 2018, both of which are hereby incorporated by reference in their entirety.

FIELD

Embodiments generally may relate to the field of wireless communications. More particularly, embodiments described herein relate to indications for narrowband system information block type 1 (SIB1-NB) transmission on a carrier.

BACKGROUND

The Internet-of-Things (IoT) is a concept in which a large number of computing devices are interconnected to each other and to the Internet to provide functionality and data acquisition at relatively low levels. IoT is envisioned as a significantly important technology component, which has huge potential, and may change our daily life entirely by enabling connectivity between tons of devices.

As used herein, an IoT device (also referred to as a "Machine-Type Communication device" or "MTC device") may include an autonomous or semiautonomous device that performs one or more functions, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or personal computer (PC), or other larger device. Further, an IoT device may be a virtual device, such as an application on a smart phone or other computing device. IoT devices may include IoT gateways, used to couple IoT devices to other IoT devices and to cloud applications, for data storage, process control, and the like. IoT devices (or groups of IoT devices) may be accessible through remote computers, servers, and other systems, for example, to control systems or access data. A group or set of IoT devices that are connected to one another using wired and/or wireless technologies may be referred to as a "network of IoT devices," an "IoT network," or the like.

Networks of IoT devices may be used for a wide variety of applications in various deployment scenarios, including commercial and home automation, smart factories or smart manufacturing, smart cities, smart environment, smart agriculture, and smart health systems. For example, IoT networks may be used for water distribution systems, electric power distribution systems, pipeline control systems, plant control systems, light switches, thermostats, locks, cameras, alarms, motion sensors, and the like.

Third Generation Partnership Project (3GPP) has standardized two designs to support IoT services: enhanced Machine Type Communication (eMTC) and Narrowband IoT (NB-IoT).

Because eMTC and NB-IoT user equipments (UEs) will be deployed in huge numbers, lowering the cost of these UEs is a key enabler for implementation of IoT. Also, low power consumption is desirable to extend the life time of the UEs' batteries. In addition, there are substantial use cases of devices deployed deep inside buildings, which would require coverage enhancement in comparison to the defined long term evolution (LTE) cell coverage footprint. In summary, eMTC and NB-IoT techniques are designed to ensure that the UEs have low cost, low power consumption, and enhanced coverage.

BRIEF DESCRIPTION OF THE FIGURES

Embodiments described herein are illustrated by way of example and not limitation in the figures of the accompanying drawings, in which like references indicate similar features. Furthermore, in the figures, some conventional details have been omitted so as not to obscure from the inventive concepts described herein.

DETAILED DESCRIPTION

Figure 1:
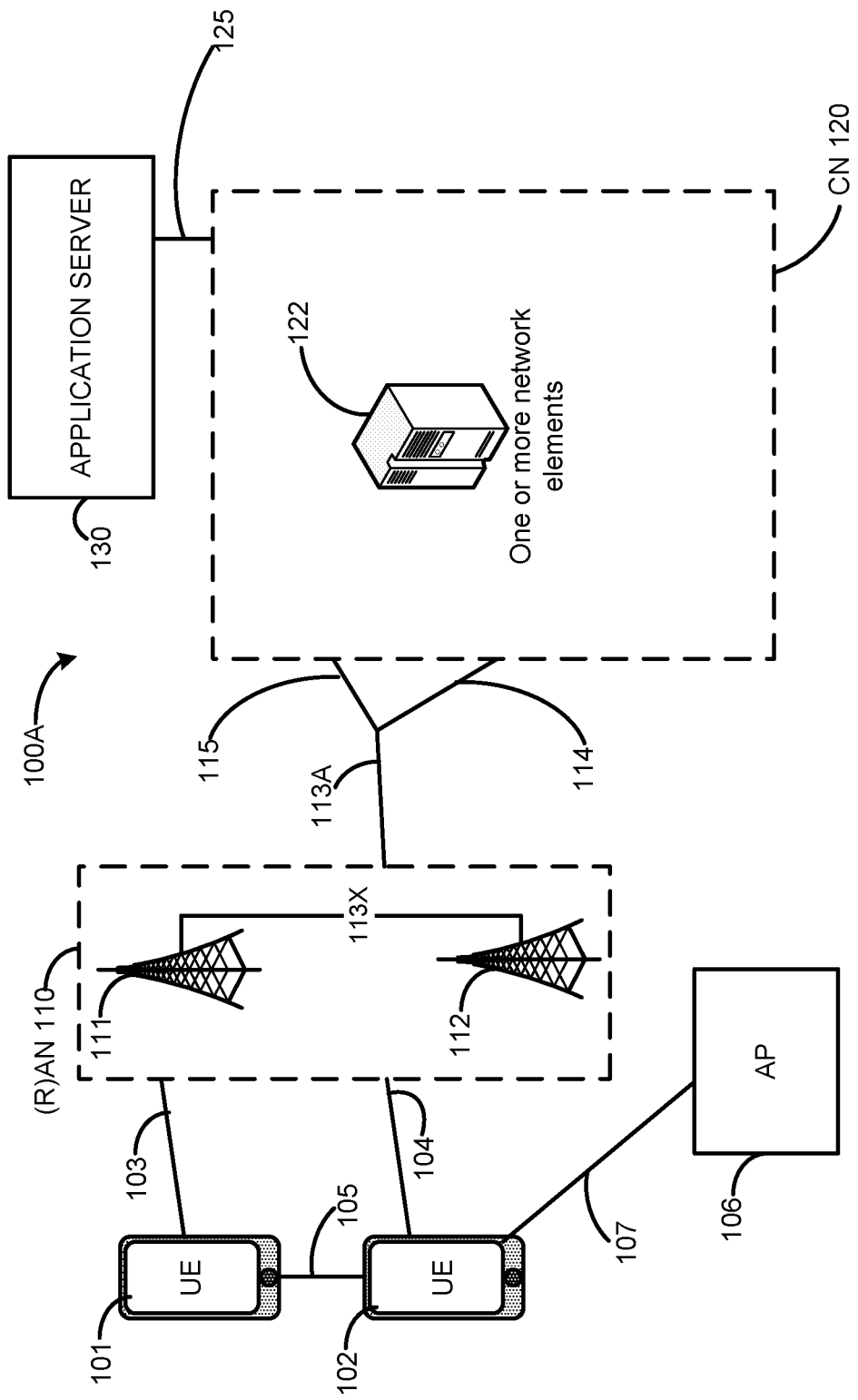
FIG. 1 illustrates an example architecture of a system of a network, in accordance with various embodiments.

Embodiments described herein relate to time division duplexing (TDD) support for in-band, guard band, and standalone operation modes of narrowband internet-of-things (NB-IoT) systems. At least one embodiment is directed to the design of indication techniques for narrowband system information block type 1 (SIB1-NB) transmission on a carrier in one or more TDD NB-IoT cells. More specifically, embodiments described herein are directed to indication techniques for cases with in-band/in-band, in-band/guard band, guard band/guard band, and standalone/standalone multi-carrier operations.

In what follows, various operations may be described as multiple discrete actions or operations in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed or described operations may be omitted in additional embodiments.

For the purposes of the present disclosure, the phrases "A or B," "A and/or B," "A/B," "at least one of A or B," "at least one of A and B," "one or more of A and B," "one or more of A or B," and mean (A), (B), or (A and B).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, including in the claims, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As used herein, including the claims, reference to "NB-IoT" includes NB-IoT technology and its later enhancements. Examples of these later enhancements include, but are not limited to, eNB-IoT technology and feNB-IoT technology. Release 13 of 3GPP technical specification (TS) 36.331 v13.0.0, dated January 2016 and entitled "Evolved Universal Terrestrial Radio Access (E-UTRA); Radio Resource Control (RRC); Protocol specification," includes information about NB-IoT. In release 13, only frequency division duplexing (FDD) is supported. Release 14 of 3GPP TS 36.331 v14.0.0, dated October 2016, includes information about eNB-IoT. In release 14, only FDD is supported. Release 15 of 3GPP TS 36.331 v15.0.0, dated January 2018, includes information about feNB-IoT. In release 15, FDD and time division duplexing (TDD) are supported.

As used herein, including the claims, an NB-IoT carrier is referred to as an "anchor carrier" if it carries Narrowband Primary and Secondary Synchronization Signals (NPSS/NSSS) and/or Narrowband Physical Broadcast Channel (NPBCH). Also, the anchor carrier is the carrier that a UE camps on during idle mode. Otherwise, as used herein, a carrier is referred to as a "non-anchor carrier." Furthermore, a non-anchor carrier can carry SIB1-NB and other system information (SI). Examples of this other SI includes, but is not limited to, other SIBs (e.g., SIB2-NB, SIB3-NB, SIB5-NB, etc.).

FIG. 1 illustrates an example architecture of a system 100 of a network, in accordance with various embodiments. The following description is provided for an example system 100 that operates in conjunction with the LTE system standards and the Fifth Generation (5G) or New Radio (NR) system standards as provided by 3rd Generation Partnership Project (3GPP) technical specifications (TSs). However, the example embodiments are not limited in this regard and the described embodiments may apply to other networks that benefit from the principles described herein, such as future 3GPP systems (e.g., Sixth Generation (6G) systems, Institute of Electrical and Electronics Engineers (IEEE) 802.16 protocols (e.g., Wireless metropolitan area networks (MAN), Worldwide Interoperability for Microwave Access (WiMAX), etc.), or the like).

As shown by FIG. 1, the system 100 may include user equipment (UE) 101*a* and UE 101*b* (collectively referred to as "UEs 101" or "UE 101"). As used herein, the term "user equipment" or "UE" may refer to a device with radio communication capabilities and may describe a remote user of network resources in a communications network. The term "user equipment" or "UE" may be considered synonymous to, and may be referred to as client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD)

devices, onboard diagnostic (OBD) devices, dashtop mobile equipment (DME), mobile data terminals (MDTs), electronic engine management system (EEMS), electronic/engine control units (ECUs), electronic/engine control modules (ECMs), embedded systems, microcontrollers, control modules, engine management systems (EMS), networked or "smart" appliances, machine-type communications (MTC) devices, enhanced machine type communication (eMTC), NB-IoT, machine-to-machine (M2M), internet-of-things (IoT) devices, and/or the like.

In some embodiments, any of the UEs 101 can comprise an IoT UE, which may comprise a network access layer designed for low-power IoT applications utilizing short-lived UE connections. An IoT UE can utilize technologies such as M2M, eMTC, NB-IoT, or MTC for exchanging data with an MTC server or device via a public land mobile network (PLMN), Proximity-Based Service (ProSe) or device-to-device (D2D) communication, sensor networks, or IoT networks. The M2M, eMTC, NB-IoT, or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

Support for TDD (RAN1, RAN2, RAN4)

Some embodiments may relate to TDD support for in-band, guard band, and/or standalone operation modes of NB-IoT systems. The design may assume no uplink (UL) compensation gaps are needed by a UE, and strive towards a common design among the deployment modes. Other advantages may include:

- relaxations of maximum coupling loss (MCL) and/or latency and/or capacity targets considered by RAN1; and
- supporting the same features as Rel-13 NB-IoT, additionally considering small-cells scenarios.

As the number of downlink (DL) subframes may be limited in TDD NB-IoT systems depending on the TDD configurations, SIB1-NB transmission on a non-anchor carrier can help offload SIB-NB transmission on an anchor carrier. With this motivation, the following agreements may be assumed for some embodiments:

it is supported that SIB1-NB is transmitted only on the anchor carrier;
in at least subframe #0 in odd frames;
it is supported that SIB1-NB can be transmitted on a non-anchor carrier;
system frame number (SFN) wraparound may be considered;
periodicity of an SIB1-NB in TDD is the same as frequency division duplex (FDD) (e.g., 2560 ms);
one transport block of an SIB1-NB is transmitted over 8 SIB1-NB subframes (e.g., same as FDD); and
it is not supported that SIB1-NB is transmitted on both anchor and non-anchor carrier.

The disclosure herein may relate to the design of indication techniques for SIB1-NB transmission on a carrier in one or more TDD NB-IoT cells. To begin with, the disclosure herein provides a brief introduction of the NB-IoT multi-carrier operation, the number of NB-IoT carriers supported in guard band, and the narrowband master information block (MIB-NB) contents.

In release 13 of 3GPP TS 36.331, operation of multiple NB-IoT carriers is supported. Any combination of anchor and non-anchor carriers between in-band and guard band operations are supported, e.g., in-band/in-band, in-band/guard band, and guard band/guard band. The operation of standalone/standalone may also be supported. However, there may be no support of NB-IoT multi-carrier operation for standalone mode with either in-band or guard band mode. The number of guard bands in LTE with different system bandwidths (BWs) is given by table 1.

TABLE 1

Number of NB-IoT carriers on the guard band for different system BWs

| System BW Megahertz (MHz) | Number of physical resource blocks (PRBs) in freq. domain | Maximum occupied BW (MHz) | Guard band on each side Kilohertz (kHz) | Number of NB-IoT carriers on each side of guard band |
|---|---|---|---|---|
| 1.4 | 6 | 1.08 | 160 | 0 |
| 3 | 15 | 2.7 | 150 | 0 |
| 5 | 25 | 4.5 | 250 | 1 |
| 10 | 50 | 9.0 | 500 | 2 |
| 15 | 75 | 13.5 | 750 | 4 |
| 20 | 100 | 18.0 | 1000 | 5 |

In release 13 of 3GPP TS 36.331, an MIB-NB has a payload of 34 bits with another 16-bit cycle redundancy check (CRC) attached, where the payload includes:

4 bits for indication of the most significant bits (MSB) of system frame number (SFN).
4 bits for SIB1-NB scheduling information indication (including indications for transport block size (TBS), number of repetitions, and subframes for SIB1-NB transmission).
2 bits for an indication of two least significant bits (LSB) of hyper SFN.
1 bit for indication of whether access barring is enabled.
2 bits for indication of operation mode including the modes of in-band (same physical cell identity (PCI) indicator), guard band, or standalone.
5 bits depend on operation modes:
    1 bit for in-band with the same PCI indicator set to false, to indicate # of cell specific reference signal (CRS) antenna ports (either same as # of ports used by NRS or 4). 2 bits to indicate the raster offset {2.5,−2.5,7.5,−7.5} kilohertz (kHz). Additionally, there would be 2 spare bits.

2 bits for guard band, to indicate the raster offset {2.5,−2.5,7.5,−7.5} kHz. Additionally, there would be 3 spare bits.

5 bits for in-band with same PCI indicator set to True to indicate the PRB index. Each value may be associated with an evolved universal terrestrial radio access (E-UTRA) PRB index as an offset from the middle of the LTE system sorted out by channel raster offset.

5 spare bits for standalone.

5 bits to indicate systemInfoValue Tag.

11 spare bits.

Detailed information element (IE) of MIB-NB is below.

| MasterInformationBlock-NB |
| --- |
| ```
-- ASN1START
MasterInformationBlock-NB ::=            SEQUENCE {
    systemFrameNumber-MSB-r13                BIT STRING (SIZE (4)),
    hyperSFN-LSB-r13                         BIT STRING (SIZE (2)),
    schedulingInfoSIB1-r13                   INTEGER (0..15),
    systemInfoValueTag-r13                   INTEGER (0..31),
    ab-Enabled-r13                           BOOLEAN,
    operationModeInfo-r13                    CHOICE {
        inband-SamePCI-r13                       Inband-SamePCI-NB-r13,
        inband-DifferentPCI-r13                  Inband-DifferentPCI-NB-r13,
        guardband-r13                            Guardband-NB-r13,
        standalone-r13                           Standalone-NB-r13
    },
    spare                                    BIT STRING (SIZE (11))
}
ChannelRasterOffset-NB-r13 ::= ENUMERATED {khz-7dot5, khz-2dot5, khz2dot5, khz7dot5}
Guardband-NB-r13 ::=                     SEQUENCE {
    rasterOffset-r13                         ChannelRasterOffset-NB-r13,
    spare                                    BIT STRING (SIZE (3))
}
Inband-SamePCI-NB-r13 ::=                SEQUENCE {
    eutra-CRS-SequenceInfo-r13               INTEGER (0..31)
}
Inband-DifferentPCI-NB-r13 ::=           SEQUENCE {
    eutra-NumCRS-Ports-r13                   ENUMERATED {same, four},
    rasterOffset-r13                         ChannelRasterOffset-NB-r13,
    spare                                    BIT STRING (SIZE (2))
}
Standalone-NB-r13 ::=                    SEQUENCE {
    spare                                    BIT STRING (SIZE (5))
}
-- ASN1STOP
``` |

| MasterInformationBlock-NB field descriptions |
| --- |
| ab-Enabled |
| Value TRUE indicates that access barring is enabled and that the UE shall acquire SystemInformationBlockType 14-NB before initiating RRC connection establishment or resume. |
| eutra-CRS-SequenceInfo |
| Information of the carrier containing NPSS/NSSS/NPBCH. Each value is associated with an E-UTRA PRB index as an offset from the middle of the LTE system sorted out by channel raster offset. |
| eutra-NumCRS-Ports |
| Number of E-UTRA CRS antenna ports, either the same number of ports as NRS or 4 antenna ports. |
| hyperSFN-LSB |
| Indicates the 2 least significant bits of hyper SFN. The remaining bits are present in SystemInformationBlockType 1-NB. |
| operationModeInfo |
| Deployment scenario (in-band/guard band/standalone) and related information. See TS 36.211 [21] and TS 36.213 [23]. |
| Inband-SamePCI indicates an in-band deployment and that the NB-IoT and LTE cell share the same physical cell id and have the same number of NRS and CRS ports. |
| Inband-DifferentPCI indicates an in-band deployment and that the NB-IoT and LTE cell have different physical cell id. |
| guardband indicates a guard band deployment. |
| standalone indicates a standalone deployment. |
| rasterOffset |
| NB-IoT offset from LTE channel raster. Unit in kHz in set {−7.5, −2.5, 2.5, 7.5}. |
| schedulingInfoSIB1 |

| MasterInformationBlock-NB field descriptions |
| --- |
| This field contains an index to a table that defines SystemInformationBlockType 1-NB scheduling information.<br>systemFrameNumber-MSB<br>Defines the 4 most significant bits of the SFN. The 6 least significant bits of the SFN are acquired implicitly by decoding the NPBCH.<br>systemInfoValueTag<br>Common for all SIBs other than MIB-NB, SIB14-NB and SIB16-NB. |

The disclosure provided herein may relate to indication techniques for SIB1-NB transmission on a carrier for TDD NB-IoT, including the indication techniques for cases with in-band/in-band, in-band/guard band, guard band/guard band, and standalone/standalone multi-carrier operations.

The supported multi-carrier operations where SIB1-NB can be transmitted on a non-anchor carrier are discussed below. Next, the indication techniques for SIB1-NB transmission on a non-anchor carrier are discussed.

Supported Multi-Carrier Operations for SIB1-NB Transmission on a Carrier

In some embodiments, all multi-carrier operations support SIB1-NB transmission on a carrier (e.g., an anchor carrier, a non-anchor carrier, etc.). Alternatively, and in one embodiment, SIB1-NB transmission on a carrier can be supported only in certain multi-carrier operations, e.g. only in-band/in-band, standalone/standalone, guard-band/in-band, or guard band/guard band. For example, when an anchor carrier is a guard band carrier, the supported non-anchor carrier to carry SIB1-NB can be a guard band carrier or an in-band carrier. For another example, when an anchor carrier is an in-band carrier, a non-anchor carrier can be an in-band carrier.

Indication Techniques for SIB1-NB Transmission on a Carrier

Operation with In-Band/In-Band Modes

In this case, both the anchor and non-anchor carrier are in-band carriers. In some embodiments, N bits can be used to indicate the offset from the anchor carrier to the non-anchor carrier. For example, N=1 is used to indicate one out of two possible non-anchor carriers that are predefined to associate with each anchor carrier (e.g., the neighboring carriers of the anchor carrier). For another example, N=2 is used to indicate one out of up to 4 possible non-anchor carriers that can carry SIB1-NB transmissions (e.g., with $\{\pm 1, \pm 2\}$ PRBs offsets from the anchor carrier).

In some examples, the offsets can be different in different system BWs, e.g., offsets can be $\{\pm 1, \pm 2\}$ PRBs for small system BW (e.g. 1.4 megahertz (MHz), 3 MHz or 5 MHz) and can be $\{\pm 1, \pm 3\}$ PRBs or $\{\pm 2, \pm 4\}$ PRBs for a large system BW (e.g. >5 MHz). In other examples, the N value can be different for different system BWs, e.g., N=1 for small system BW (e.g. <=3 MHz or <=5 MHz) and N=2 for large system BW (e.g. >3 or >5 MHz).

The N bits can be carried in an MIB-NB, e.g., N out of 11 spare bits in the MIB-NB can be used.

Operation with in-Band/Guard Band Modes

In this case, an anchor carrier and an non-anchor carrier can be an in-band carrier and a guard band carrier, or a guard band carrier and an in-band carrier, respectively.

In some embodiments, several pairs of in-band carrier(s) and guard band carrier(s) can be predefined.

In one example, when the anchor carrier is in-band, N bits can be used to indicate the non-anchor carrier in guard band for SIB1-NB transmission. For example, N=1 can be used to indicate one out of two sides of the system BW where the non-anchor carrier is located. In system BWs that have multiple guard band NB-IoT carriers at each side, one out of these multiple carriers can be predefined (e.g. the first one or last one). As another example, N can be different for different system BWs, e.g., N=2 for system BW of 10 MHz, N=3 for system BW of 15 MHz, and N=4 for system BW of 20 MHz to indicate which guard band carrier is used for SIB1-NB transmission.

In one example, when the anchor carrier is guard band, a set of corresponding in-band carriers can be predefined, e.g., ceil(log 2(X)) bits can be used to indicate X predefined in-band non-anchor carriers for SIB1-NB transmission. As one example, 2 or 4 in-band carriers which are closest to the anchor carrier can be used for SIB1-NB transmissions, and 1 bit or 2 bits can be used to indicate which carrier out of these 2 or 4 in-band non-anchor carriers is used for SIB1-NB transmission.

In cases where there are multiple guard band carriers, in one example, only one predefined guard band carrier can be used for an anchor carrier, e.g. the $1^{st}$ or last one on the upper or lower side of system BW. Alternatively, the guard band carrier for an anchor carrier can be indicated, e.g., 1 bit, 2 bits, 3 bits, or 4 bits for a system BW of 5, 10, 15 and 20 MHz, respectively. Alternatively, 0 bits, 1 bit, 2 bits, or 3 bits can be used for a system BW of 5, 10, 15 and 20 MHz respectively to indicate one guard band carrier at one side of the system BW, while 1 bit is additionally used to indicate the side that the guard band anchor carrier locates, which implies the location of the in-band non-anchor carrier (e.g., the closest one to the anchor carrier that can be above or below the anchor carrier depending on the anchor carrier's location).

In one embodiment, besides the bits needed, as discussed above, the system BW can be indicated to let the UEs know the location of guard band. For example, 2 bits can be used to indicate the system BW from the set $\{5, 10, 15, 20\}$. Alternatively, the system BW and guard band carrier can be jointly coded, e.g., 5 bits can be used to indicate {guard band 0 or 1 with 5 MHz system BW, guard band 0-3 with 10 MHz system BW, guard band 0-7 with 15 MHz system BW, guard band 0-9 with 20 MHz BW}, or 4 bits can be used to indicate {guard band 0 with 5 MHz system BW, guard band 0-1 with 10 MHz system BW, guard band 0-3 with 15 MHz system BW, guard band 0-4 with 20 MHz BW} in cases where the side of the guard band carriers have been indicated/predefined.

In some embodiments, certain offsets from the system BW's edge or from the anchor carrier can be defined. The set of possible offset values can be the same or different for different system BWs. The offset can be in terms of hertz (Hz) or PRBs.

Taking offset in terms of PRBs as an example, the offset can be any value from –X to X PRBs, where X can be 25 for a 5 MHz system BW, X can be 51 for a 10 MHz system BW, X can be 78 for a 15 MHz system BW, or X can be 104 for a 20 MHz system BW. To minimize the size of bits needed for the indication, the offsets can be limited to certain values and can be a subset of {−X, −X+1, . . . , X−1, X}. For example, by limiting the anchor carrier to be certain PRB (e.g., edge PRB) in the system, the offset can be reduced to {−2, −1, 1, 2} or {−1, 1}.

In embodiments where the offset values are different for different system BWs, a system BW can be indicated. For example, 2 bits can be used to indicate the system BW from the set {5, 10, 15, 20}. Alternatively, or additionally, the offsets and the system BW can be jointly indicated in a way that is similar to the joint indication of the guard band index and the system BW. For example, 5 bits can be used to indicate {±1 for 5 MHz system BW, ±2 for 10 MHz system BW, ±4 for 15 MHz system BW and ±5 for 20 MHz system BW}, or 4 bits to indicate {1 for 5 MHz system BW, 2 for 10 MHz system BW, 4 for 15 MHz system BW and 5 for 20 MHz system BW}, where the anchor carrier is limited to a certain PRB (e.g., a cell edge PRB for in-band case and first guard band carrier for guard band case, etc.).

A part of 11 spare bits in an MIB-NB can be used for the indication. In embodiments where an anchor carrier is a guard band carrier, the 3 spare bits in the 5-bit field for indication of raster offset can be used.

Operation with Guard Band/Guard Band Modes

In this case, both anchor carriers and non-anchor carriers are guard band carriers.

In some embodiments, the non-anchor carrier is always the symmetric guard band carrier on the other side of the system BW. For a system BW of 10, 15, or 20 MHz that has multiple guard band carriers in each side, additional bits can be used to indicate which guard band carrier the anchor carrier locates. For example, 1, 2, and 3 bits can be used for a system BW of 10, 15 and 20 MHz, respectively. Alternatively, the anchor carrier can be predefined among possible guard band carriers, and thus no bits are needed to indicate the symmetric guard band carrier of system BW of 10, 15 or 20 MHz.

In some embodiments, N bits can be used to indicate which guard band carrier is used for the non-anchor carrier, e.g. N=0 or 1 for system BW of 5 MHz, N=2 for system BW of 10 MHz, N=3 for system BW of 15 MHz or N=4 for system BW of 20 MHz. To reduce the number of bits, in one example, for system BW>5 MHz, the guard band non-anchor carrier can be predefined to always locate at the other side of the system BW, or always locate at the same side of the system BW, which can help reduce 1 bit.

For the above embodiments in this case, 2 bits can be used to indicate the system BW from the set {5, 10, 15, 20}. The reserved bits in the MIB-NB can be used for the indication. As another embodiment, the 3 spare bits in the 5-bit field for indication of raster offset can be used as well. For example, the 3 spare bits in the 5-bit field can be used to indicate which guard band carrier is used for non-anchor carrier with SIB1-NB transmission, while 2 bits out of 11 spare bits in MIB-NB can be used to indicate the system BW.

Operation with Standalone/Standalone Mode

In this case, both the anchor and non-anchor carrier are standalone carriers. Similar to in-band/in-band cases, N bits can be used to indicate the offset from the anchor carrier to the non-anchor carrier, e.g., N=1 to indicate one out of two possible non-anchor carriers that are predefined to associate to each anchor carrier (e.g. the neighboring carriers of the anchor carrier), or N=2 to indicate one out of up to 4 possible non-anchor carriers which can carry SIB1-NB transmission (e.g. with {±1, ±2} PRBs offsets from anchor carrier).

The N bits can be carried in the MIB-NB, e.g., N out of 11 spare bits in the MIB-NB can be used. As another example, the 5 spare bits for the 5-bit field (which indicates the CRS ports or raster offset information for in-band or guard band modes) can be used besides the 11 spare bits for standalone mode. As there are more spare bits in the standalone mode, N can be larger in the standalone mode. For example, N can be up to 5 to indicate one out of up to 32 possible non-anchor carriers that can carry SIB1-NB transmission.

Overall Indication

In some embodiments, besides the above indication, 1 additional bit can be used to indicate whether the SIB1-NB transmission is on an anchor or a non-anchor carrier. In one example, this can be used when the supported multi-carrier operations for SIB1-NB transmission on a non-anchor carrier are in-band/in-band, guard band/guard band, and standalone/standalone. Once the operation mode of the anchor carrier is indicated by the MIB-NB, the indication implies the corresponding non-anchor carrier mode. An example of this embodiment is provided below, combining the 1 bit indication and embodiments used for indication of which non-anchor carrier is carrying SIB1-NB as discussed above. It is to be appreciated that other examples are not precluded.

Example 1

1 out of 11 spare bits in the MIB-NB can be used to indicate whether SIB1-NB transmission is on an anchor carrier or a non-anchor carrier.

Another 2 out of 11 spare bits in the MIB-NB can be used to indicate which the non-anchor carrier is used for SIB1-NB transmission, depending on the operation mode:

When the anchor carrier is in-band, 2 bits can be used to indicate four possible non-anchor in-band carriers, e.g. with offset of {−2, −1, 1, 2} PRB(s) from the anchor carrier.

When the anchor carrier is guard band:

In one example, the non-anchor carrier is always the symmetric guard band carrier on the other side of the system BW. 2 bits can be used to indicate the system BW. For a system BW of 10, 15, or 20 MHz that has multiple guard band carriers in each side, additional bits can be used to indicate which guard band carrier the anchor carrier locates. For example, 1, 2, or 3 bits can be used for a system BW of 10, 15 and 20 MHz, respectively. 2 reserved bits out of 11 spare bits in addition to the 3 spare bits in the 5-bit field for raster offset indication can be used.

In another example, N bits can be used to indicate which guard band carrier is used for the non-anchor carrier, e.g., N=0 for system BW of 5 MHz, N=1 for system BW of 10 MHz, N=2 for system BW of 15 MHz or N=3 for system BW of 20 MHz (e.g. $2^N$ out of all possible guard band non-anchor carriers can be indicated). The 2 MSBs uses the 2 spare bits out of 11 bits, while the additional 1 (if N=3) bit can use the 3 spare bits in the 5-bit field for raster offset indication with the remaining 2 bits used for indication of the system BW. Alternatively, the 3 bits are the spare bits in the 5-bit field for raster offset indication, and the 2 bits out of 11 spare bits can be used to indicate system BW. As another example, N can be 1 for a system BW of 10 MHz, 15 MHz, or 20 MHz, which indicates whether the guard band carrier is to the right or left of the anchor carrier. That is, when N is 1 for a system BW of 10 MHz, 15 MHz, or 20 MHz, N indicates whether the non-anchor carrier, which is to be used for SIB1-NB transmission, is to the right or left of the anchor carrier.

When the anchor carrier is a standalone carrier:
In one example, the 2 bits can be used to indicate four possible non-anchor standalone carriers, e.g., with offset of {−2, −1, 1, 2} PRB(s) from anchor carrier.
As another example, up to 7 bits (where in addition to 2 bits, there are 5 spare bits in the 5-bit field for indication of CRS information for in-band, or raster offset for in-band and guard band modes) can be used to indicate up to 128 possible non-anchor carriers.
Alternatively, the 5 spare bits in the 5-bit field for indication of CRS information for in-band or raster offset for in-band and guard band modes can be used to indicate up to 32 possible non-anchor carriers (e.g., 2 out of 5 bits for indication of 4 possible non-anchor carriers), while there are 10 spare bits out of 11 spare bits in the MIB-NB for this case.

In this example, 3 out of 11 spare bits will be used to support SIB1-NB transmission in the non-anchor carrier.

In other embodiments, 2 bits can be used to indicate SIB1-NB transmission as follows. This can be used when guard band/in-band or in-band/guard band mode is supported for SIB1-NB transmission on the non-anchor carrier.

If the anchor carrier is a standalone carrier, the 2 bits can be used to indicate SIB1-NB transmission on the anchor carrier or on the standalone non-anchor carrier with X PRBs from anchor carrier, where X can have up to 2 values, e.g., {−1, −2, 2}. If more non-anchor carriers can be configured for SIB1-NB transmission, additional bits can be used as elaborated above for the standalone/standalone case.

If the anchor carrier is an in-band carrier or a guard band carrier, the 2 bits can be used to indicate SIB1-NB transmission on the anchor carrier, on the in-band non-anchor carrier, or on the guard band non-anchor carrier. As elaborated above, once the modes for the anchor carrier and the non-anchor carrier are indicated, additional bits can be used to indicate which non-anchor carrier is used for SIB1-NB transmission.

An example of this embodiment is discussed below. It is to be appreciated that other examples are not precluded.

Example 2

8, 5, or 4 (depending on the N value below) out of 11 spare bits can be used to indicate the SIB1-NB transmission.

When the anchor carrier is in-band, 2 bits out of 11 spare bits can be used to indicate whether the SIB1-NB is transmitted on the anchor carrier, the in-band non-anchor carrier, or the guard band non-anchor carrier. Another 2 bits out of 11 spare bits can be used to indicate the system BW if SIB1-NB is transmitted on the guard band non-anchor carrier.
In one example, the 2 bits can be used to indicate SIB1-NB transmission on {anchor carrier, in-band non-anchor carrier that is M PRB before the anchor carrier, the in-band non-anchor carrier that is M PRB after the anchor carrier, the guard band non-anchor carrier} where M is an integer that is predefined (e.g. M=1 or 2).
When the 2 bits indicate SIB1-NB transmission on the guard band non-anchor carrier, other N bits out of 11 spare bits can be used to indicate which guard band carrier is used for the non-anchor carrier. For example, N=1 for a system BW of 5 MHz, N=2 for system BW of 10 MHz, N=3 for system BW of 15 MHz, or N=4 for system BW of 20 MHz. Alternatively, to minimize the number of bits needed for the indication, two possible non-anchor carriers can be predefined (e.g., the first guard band carrier, the last guard band carrier, etc.). Also, N=1 can be used. As another example, N can be reduced to 0 by a predefined guard band carrier for SIB1-NB transmission (e.g., the first guard band carrier, the last guard band carrier, etc.).
In one example, the 2 bits can be used to indicate SIB1-NB transmission on {anchor carrier subframe #0, anchor carrier subframe #K, in-band non-anchor carrier, guard band non-anchor carrier}, where K can be any subframe except subframes #0, 5, 9 (e.g., 4). Then for the in-band non-anchor carrier, 1 additional bit can be used to indicate which in-band non-anchor carrier is used, e.g., with offset {−1, +1} resource blocks (RB) from the anchor carrier. For the guard band non-anchor carrier, the indication technique can be the same as the above sub-bullet.

When the anchor carrier is a guard band carrier, 2 bits out of 11 spare bits can be used to indicate whether the SIB1-NB is transmitted on the anchor carrier, the in-band non-anchor carrier, or the guard band non-anchor carrier. Another 2 bits out of 11 spare bits can be used to indicate the system BW.
In one example, the 2 bits can be used to indicate SIB1-NB transmission on {anchor carrier, in-band non-anchor carrier #0, in-band non-anchor carrier #1, guard band non-anchor carrier}, where the in-band non-anchor carriers #0 and #1 can be two predefined in-band carriers that may be used for SIB1-NB transmission and are associated with the guard band anchor carrier.

When the guard band non-anchor carrier is indicated, the symmetric guard band carrier corresponding to the anchor carrier can be used for SIB1-NB transmission. Consequently, no explicit indication would be needed for indication of the non-anchor carrier when the anchor carrier location for each system BW is predefined in this case. Alternatively, N bits can be used to indicate the guard band non-anchor carrier, where N=0, 1, 2 and 3 for system BW of 5 MHz, 10 MHz, 15 MHz, or 20 MHz, respectively. As another example, N can be 1 to indicate whether the non-anchor carrier is next to or before the anchor carrier. The N bits can be out of 11 spare bits or can use the 3 spare bits in the 5-bit field for indication of raster offset.
In one example, the 2 bits can be used to indicate SIB1-NB transmission on {anchor carrier subframe #0, anchor carrier subframe #K, in-band non-anchor carrier, guard band non-anchor carrier}, where K can be any subframe except subframes #0, 5, 9 (e.g., 4).
For the in-band non-anchor carrier, N additional bits can be used to indicate which in-band non-anchor carrier is used, e.g. with $2^N$ possible predefined in-band non-anchor carriers associated with the anchor guard band carrier, such as N=3, 1, or 0.
For the guard band non-anchor carrier, the indication technique can be the same as the above sub-bullet.
The N bits can be out of 11 spare bits or can use the 3 spare bits in the 5-bit field for indication of raster offset.

When the anchor carrier is a standalone carrier, 1 bit can be used to indicate whether SIB1-NB transmission is on the anchor carrier or the non-anchor carrier. Also, another bit can be used to indicate which subframe (e.g., subframe #0, another subframe other than subframes #0, 5, and 9) is used for SIB1-NB transmission when the anchor carrier is used for SIB1-NB transmission.

Additionally, N bits can be used to indicate one out of $2^N$ possible non-anchor carriers that may be used for SIB1-NB transmission. These $2^N$ possible non-anchor carriers can be predefined, e.g., with offsets from the anchor carrier. For example, N can be 2 with 4 possible non-anchor carriers that may be used for SIB1-NB transmission, e.g., the carrier with offsets of {−2, −1, 1, 2} PRB(s) from the anchor carrier. These 2+N bits can be from the 8 or 5 bits out of 11 spare bits and/or from the 5 spare bits in the 5-bit field for indication of CRS information for the in-band mode or raster offset for the in-band and guard band modes.

As another embodiment, the in-band/in-band, guard band anchor/in-band non-anchor, guard band/guard band, and/or standalone/standalone scenarios are supported. Table 2 provides an example of the indication technique for the non-anchor carrier's location for SIB1-NB transmission.

whether the raster offset absolute value is 2.5 kHz or 7.5 kHz. Consequently, one more bit can be used to further identify the system BW, e.g., 5 MHz or 15 MHz if it is an odd system BW and 10 or 20 MHz if it is an even system BW. Table 3, which is below, provides two examples of the indication method for a non-anchor carrier's location for SIB1-NB transmission. In one example, the 1 bit used to indicate the number of CRS ports used for the scenario that includes a guard band anchor carrier and an in-band non-anchor scenario is used to differentiate the scenarios where the CRS has the same number of ports as the narrowband reference signal (NRS) or the number of CRS ports is 4, similar to the indication for the in-band anchor with differentPCI. This can be applied to differentPCI only (where the same number of ports as NRS is assumed for the samePCI scenario) Alternatively, or additionally, this can also be

TABLE 2

Example of indication technique for non-anchor carrier location with SIB1-NB

| Scenarios | 1 reserved bit | 2 additional reserved bits | Up to 3 bits in 5-bit field for indication of raster offset |
|---|---|---|---|
| In-band/in-band | SIB1-NB on anchor or non-anchor | Offsets from anchor carrier | N/A |
| Guard band anchor + in-band non-anchor | | System BW | 1 bit to indicate whether non-anchor is in-band or guard band. Up to 2 additional bits to in-band non-anchor carrier. |
| Guard band/guard band | | System BW | 1 bit to indicate whether non-anchor is in-band or guard band. Up to 2 additional bits to indicate offsets from the anchor carrier. |
| Standalone/standalone | | Offsets from anchor carrier | N/A |

In another example, for the guard band anchor case, the 2-bit raster offset indication in the MIB-NB implies which side the guard band anchor carrier is located depending whether the raster offset is negative or positive. Additionally, or alternatively, the 2-bit raster offset indication indicates whether the system BW is even or odd depending on applied to both differentPCI and samePCI cases. As another alternative to table 3, the 1 bit used for indication of samePCI or differentPCI can be removed. This can be applied to the cases where the UE would not use LTE CRS for the in-band non-anchor carrier.

TABLE 3

Two examples of indication methods for non-anchor carrier location with SIB1-NB transmission

| Scenarios | 1 reserved bit | 1 additional reserved bit | Up to 3 bits in 5-bit field for indication of raster offset |
|---|---|---|---|
| In-band/in-band | SIB1-NB on anchor | Offsets from anchor carrier | N/A |
| Guard band anchor + in-band non-anchor | or non-anchor | System BW | 1 bit to indicate whether non-anchor is in-band or guard band. 1 bit to indicate whether it is samePCI or differentPCI. 1 bit to indicate number of CRS ports. |
| Guard band/guard band | | System BW | 1 bit to indicate whether non-anchor is in-band or guard band. |
| Standalone/standalone | | Offsets from anchor carrier | N/A |
| In-band/in-band | SIB1-NB on anchor | Offsets from anchor carrier | N/A |

TABLE 3-continued

Two examples of indication methods for non-anchor carrier location with SIB1-NB transmission

| Scenarios | 1 reserved bit | 1 additional reserved bit | Up to 3 bits in 5-bit field for indication of raster offset |
|---|---|---|---|
| Guard band anchor + in-band non-anchor | or non-anchor | Reserved | 1 bit to indicate whether non-anchor is in-band or guard band. 1 bit to indicate whether it is samePCI or differentPCI. 1 bit to indicate number of CRS ports for differentPCI case and to indicate the system BW for samePCI case. |
| Guard band/guard band | | Reserved | 1 bit to indicate whether non-anchor is in-band or guard band. 1 bit to indicate the system BW. |
| Standalone/standalone | | Offsets from anchor carrier | N/A |

Referring again to FIG. 1, the UEs 101 may be configured to connect, for example, communicatively couple, with an access network (AN) or a radio access network (RAN) 110. In embodiments, the RAN 110 may be a next generation (NG) RAN or a 5G RAN, an Evolved Universal Mobile Telecommunications System (UMTS) Terrestrial Radio Access Network (E-UTRAN), or a legacy RAN, such as a UTRAN (UMTS Terrestrial Radio Access Network) or GERAN (GSM (Global System for Mobile Communications or Groupe Special Mobile) EDGE (GSM Evolution) Radio Access Network). As used herein, the term "NG RAN" or the like may refer to a RAN 110 that operates in an NR or 5G system 100, and the term "E-UTRAN" or the like may refer to a RAN 110 that operates in an LTE or 4G system 100. The UEs 101 utilize connections (or channels) 103 and 104, respectively, each of which comprises a physical communications interface or layer (discussed in further detail below). As used herein, the term "channel" may refer to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

In this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and/or any of the other communications protocols discussed herein. In embodiments, the UEs 101 may directly exchange communication data via a ProSe interface 105. The ProSe interface 105 may alternatively be referred to as a sidelink (SL) interface 105 and may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 101b is shown to be configured to access an access point (AP) 106 (also referred to as also referred to as "WLAN node 106", "WLAN 106", "WLAN Termination 106" or "WT 106" or the like) via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below). In various embodiments, the UE 101b, RAN 110, and AP 106 may be configured to utilize LTE-WLAN aggregation (LWA) operation and/or WLAN LTE/WLAN Radio Level Integration with IPsec Tunnel (LWIP) operation. The LWA operation may involve the UE 101b in RRC CONNECTED being configured by a RAN node 111 to utilize radio resources of LTE and WLAN. LWIP operation may involve the UE 101b using WLAN radio resources (e.g., connection 107) via Internet Protocol Security (IPsec) protocol tunneling to authenticate and encrypt packets (e.g., internet protocol (IP) packets) sent over the connection 107. IPsec tunneling may include encapsulating entirety of original IP packets and adding a new packet header thereby protecting the original header of the IP packets.

The RAN 110 can include one or more AN nodes or RAN nodes 111a and 111b (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as base stations (BS), next Generation NodeBs (gNBs), RAN nodes, evolved NodeBs (eNBs), NodeBs, Road Side Units (RSUs), Transmission Reception Points (TRxPs or TRPs), and so forth, and can comprise ground stations (e.g., terrestrial access points) or satellite stations providing coverage within a geographic area (e.g., a cell). The term "Road Side Unit" or "RSU" may refer to any transportation infrastructure entity implemented in or by an gNB/eNB/RAN node or a stationary (or relatively stationary) UE, where an RSU implemented in or by a UE may be referred to as a "UE-type RSU", an RSU implemented in or by an eNB may be referred to as an "eNB-type RSU." As used herein, the term "NG RAN node" or the like may refer to a RAN node 111 that operates in an NR or 5G system 100 (for example a gNB), and the term "E-UTRAN node" or the like may refer to a RAN node 111 that operates in an LTE or 4G system 100 (e.g., an eNB). According to various embodiments, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells. In other embodiments, the RAN nodes 111 may be implemented as one or more software entities running on server computers as part of a virtual network, which may be referred to as a cloud radio access network (CRAN). In other embodiments, the RAN nodes 111 may represent individual gNB-distributed units (DUs) that are connected to a gNB-centralized unit (CU) via an F1 interface (not shown by FIG. 1).

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using Orthogonal Frequency-Division Multiplexing (OFDM) communication signals with each other or with any of the RAN nodes 111 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The narrowband physical downlink shared channel (NPDSCH) may carry user data and higher-layer signaling to the UEs 101. The narrowband physical downlink control channel (NPDCCH) may carry information about the transport format and resource allocations related to the NPDSCH channel, among other things. The NPDCCH may also inform the UEs 101 about the transport format, resource allocation, and Hybrid Automatic Repeat Request (HARD) information related to the uplink shared channel. Typically, downlink scheduling (assigning control and shared channel resource blocks to the UE 101b within a cell) may be performed at any of the RAN nodes 111 based on channel quality information fed back from any of the UEs 101. The downlink resource assignment information may be sent on the NPDCCH/NPDSCH used for (e.g., assigned to) each of the UEs 101.

The NPDCCH/NPDSCH may use control channel elements (CCEs) to convey the control information. Before being mapped to resource elements, the NPDCCH/NPDSCH complex-valued symbols may first be organized into quadruplets, which may then be permuted using a sub-block interleaver for rate matching. Each NPDCCH/NPDSCH may be transmitted using one or more of these CCEs, where each CCE may correspond to nine sets of four physical resource elements known as resource element groups (REGs). Four Quadrature Phase Shift Keying (QPSK) symbols may be mapped to each REG. The NPDCCH/NPDSCH can be transmitted using one or more CCEs, depending on the size of the downlink control information (DCI) and the channel condition. There can be four or more different NPDCCH/NPDSCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced control channel elements (ECCEs). Each ECCE may correspond to 9 sets of 4 physical resource elements known as enhanced resource element groups (EREGs). An ECCE may have other numbers of EREGs in some situations.

The RAN nodes 111 may be configured to communicate with one another via interface 112. In embodiments where the system 100 is an LTE system, the interface 112 may be an X2 interface 112. The X2 interface may be defined between two or more RAN nodes 111 (e.g., two or more enhanced NodeBs (eNBs) and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a master eNB (MeNB) to a secondary eNB (SeNB); information about successful in sequence delivery of PDCP protocol data units (PDUs) to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 100 is a 5G or NR system, the interface 112 may be an Xn interface 112. The Xn interface is defined between two or more RAN nodes 111 (e.g., two or more next generation NodeBs (gNBs) and the like) that connect to 5GC 120, between a RAN node 111 (e.g., a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network, which in this embodiment is Core Network (CN) 120. The CN 120 may comprise a plurality of network elements 122, which are configured to offer various data and telecommunications services to customers/subscribers (e.g., users of UEs 101) who are connected to the CN 120 via the RAN 110. The term "network element" may describe a physical or virtualized equipment used to provide wired or wireless communication network services. The term "network element" may be considered synonymous to and/or referred to as a networked computer, networking hardware, network equipment, router, switch, hub, bridge, radio network controller, radio access network device, gateway, server, virtualized network function (VNF), network functions virtualization infrastructure (NFVI), and/or the like. The components of the CN 120 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above described network node functions via executable instructions stored in one or more computer readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 130 may be an element offering applications that use IP bearer resources with the core network (e.g., UMTS Packet Services (PS) domain, LTE PS data services, etc.). The application server 130 can also be configured to support one or more communication services (e.g., Voice-over-Internet Protocol (VoIP) sessions, PTT sessions, group communication sessions, social networking services, etc.) for the UEs 101 via the EPC 120.

In embodiments, the CN 120 may be a 5GC (referred to as "5GC 120" or the like), and the RAN 110 may be connected with the CN 120 via an NG interface 113. In embodiments, the NG interface 113 may be split into two parts, an NG user plane (NG-U) interface 114, which carries traffic data between the RAN nodes 111 and a user plane function (UPF), and the S1 control plane (NG-C) interface 115, which is a signaling interface between the RAN nodes 111 and Access and Mobility Functions (AMFs). Embodiments where the CN 120 is a 5GC 120 are discussed in more detail with regard to FIG. 3.

In embodiments, the CN 120 may be a 5G CN (referred to as "5GC 120" or the like), while in other embodiments, the CN 120 may be an Evolved Packet Core (EPC)). Where CN 120 is an EPC (referred to as "EPC 120" or the like), the RAN 110 may be connected with the CN 120 via an S1 interface 113. In embodiments, the S1 interface 13 may be split into two parts, an S1 user plane (S1-U) interface 114, which carries traffic data between the RAN nodes 111 and the serving gateway (S-GW), and the S1-mobility management entity (MME) interface 115, which is a signaling interface between the RAN nodes 111 and MMEs. An example architecture wherein the CN 120 is an EPC 120 is shown by FIG. 2.

Figure 2:
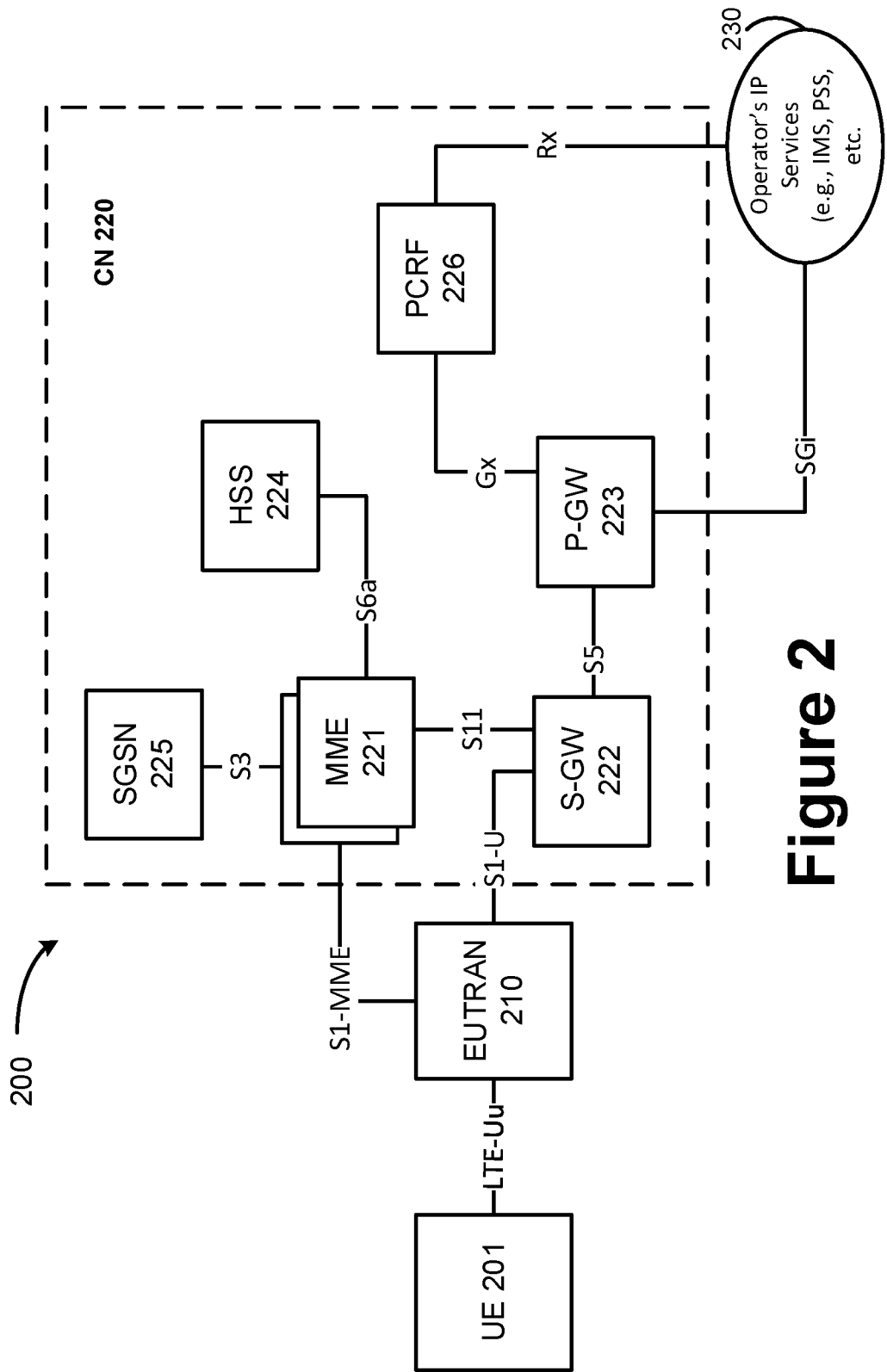
FIG. 2 illustrates an example architecture of a system including a first core network (CN), in accordance with various embodiments.

FIG. 2 illustrates an example architecture of a system 200 including a first CN 220 is shown, in accordance with various embodiments. In this example, system 200 may implement the LTE standard wherein the CN 220 is an EPC 220 that corresponds with CN 120 of FIG. 1. Additionally, the UE 201 may be the same or similar as the UEs 101 of FIG. 1, and the EUTRAN 210 may be a RAN that is the same or similar to the RAN 110 of FIG. 1, and which may include RAN nodes 111 discussed previously. The CN 220 may comprise MMEs 221, an S-GW 222, a Packet Data Network (PDN) Gateway (P-GW) 223, a home subscriber server (HSS) 224, and a Serving General Packet Radio Service (GPRS) Support Nodes (SGSN) 225.

The MMEs 221 may be similar in function to the control plane of legacy SGSN, and may implement mobility management (MM) functions to keep track of the current location of a UE 201. The MMEs 221 may perform various MM procedures to manage mobility aspects in access such as gateway selection and tracking area list management. MM (also referred to as "EPS MM" or "EMM" in E-UTRAN systems) may refer to all applicable procedures, methods, data storage, etc. that are used to maintain knowledge about a present location of the UE 201, provide user identity confidentiality, and/or other like services to users/subscribers. Each UE 201 and the MME 221 may include an MM or EMM sublayer, and an MM context may be established in the UE 201 and the MME 221 when an attach procedure is successfully completed. The MM context may be a data structure or database object that stores MM-related information of the UE 201. The MMES 221 may be coupled with the HSS 224 via an S6a reference point, coupled with the SGSN 225 via an S3 reference point, and coupled with the S-GW 222 via an S11 reference point.

The SGSN 225 may be a node that serves the UE 201 by tracking the location of an individual UE 201 and performing security functions. In addition, the SGSN 225 may perform Inter-EPC node signaling for mobility between 2G/3G and E-UTRAN 3GPP access networks; PDN and S-GW selection as specified by the MMES 221; handling of UE 201 time zone functions as specified by the MMES 221; and MME selection for handovers to E-UTRAN 3GPP access network. The S3 reference point between the MMES 221 and the SGSN 225 may enable user and bearer information exchange for inter-3GPP access network mobility in idle and/or active states.

The HSS 224 may comprise a database for network users, including subscription-related information to support the network entities' handling of communication sessions. The EPC 220 may comprise one or several HSSs 224, depending on the number of mobile subscribers, on the capacity of the equipment, on the organization of the network, etc. For example, the HSS 224 can provide support for routing/roaming, authentication, authorization, naming/addressing resolution, location dependencies, etc. An S6a reference point between the HHS 224 and the MMES 221 may enable transfer of subscription and authentication data for authenticating/authorizing user access to the EPC 220 between HHS 224 and the MMES 221.

The S-GW 222 may terminate the S1 interface 513 ("S1-U" in FIG. 2) towards the RAN 210, and routes data packets between the RAN 210 and the EPC 220. In addition, the S-GW 222 may be a local mobility anchor point for inter-RAN node handovers and also may provide an anchor for inter-3GPP mobility. Other responsibilities may include lawful intercept, charging, and some policy enforcement. The S11 reference point between the S-GW 222 and the MMES 221 may provide a control plane between the MMES 221 and the S-GW 222. The S-GW 222 may be coupled with the P-GW 223 via an S5 reference point.

The P-GW 223 may terminate an SGi interface toward a Packet Data Network (PDN) 230. The P-GW 223 may route data packets between the EPC 220 and external networks such as a network including the application server 130 (alternatively referred to as application function (AF)) via an Internet Protocol (IP) interface 125 (see e.g., FIG. 1). In embodiments, the P-GW 223 may be communicatively coupled to an application server (application server 130 of FIG. 1 or PDN 230 in FIG. 2) via an IP communications interface 525 (see e.g., FIG. 1). The S5 reference point between the P-GW 223 and the S-GW 222 may provide user plane tunneling and tunnel management between the P-GW 223 and the S-GW 222. The S5 reference point may also be used for S-GW 222 relocation due to UE 201 mobility and if the S-GW 222 needs to connect to a non-collocated P-GW 223 for the required PDN connectivity. The P-GW 223 may further include a node for policy enforcement and charging data collection (e.g., Policy and Charging Enforcement Function (PCEF) (not shown). Additionally, the SGi reference point between the P-GW 223 and the packet data network (PDN) 230 may be an operator external public, a private PDN, or an intra operator packet data network, for example, for provision of IMS services. The P-GW 223 may be coupled with a PCRF 226 via a Gx reference point.

Policy and Charging Enforcement Function (PCRF) 226 is the policy and charging control element of the EPC 220. In a non-roaming scenario, there may be a single PCRF 226 in the Home Public Land Mobile Network (HPLMN) associated with an UE's 201 Internet Protocol Connectivity Access Network (IP-CAN) session. In a roaming scenario with local breakout of traffic, there may be two PCRFs associated with an UE's 201 IP-CAN session, a Home PCRF (H-PCRF) within a HPLMN and a Visited PCRF (V-PCRF) within a Visited Public Land Mobile Network (VPLMN). The PCRF may be communicatively coupled to the application server 230 via the P-GW 223. The application server 230 may signal the PCRF to indicate a new service flow and select the appropriate Quality of Service (QoS) and charging parameters. The PCRF 226 may provision this rule into a Policy and Charging Enforcement Function (PCEF) (not shown) with the appropriate traffic flow template (TFT) and QoS class of identifier (QCI), which commences the QoS and charging as specified by the application server 230. The Gx reference point between the PCRF 226 and the P-GW 223 may allow for the transfer of (QoS) policy and charging rules from the PCRF 226 to Policy and Charging Enforcement Function (PCEF) in the P-GW 223. An Rx reference point may reside between the PDN 230 (or "AF 230") and the PCRF 226.

Figure 3:
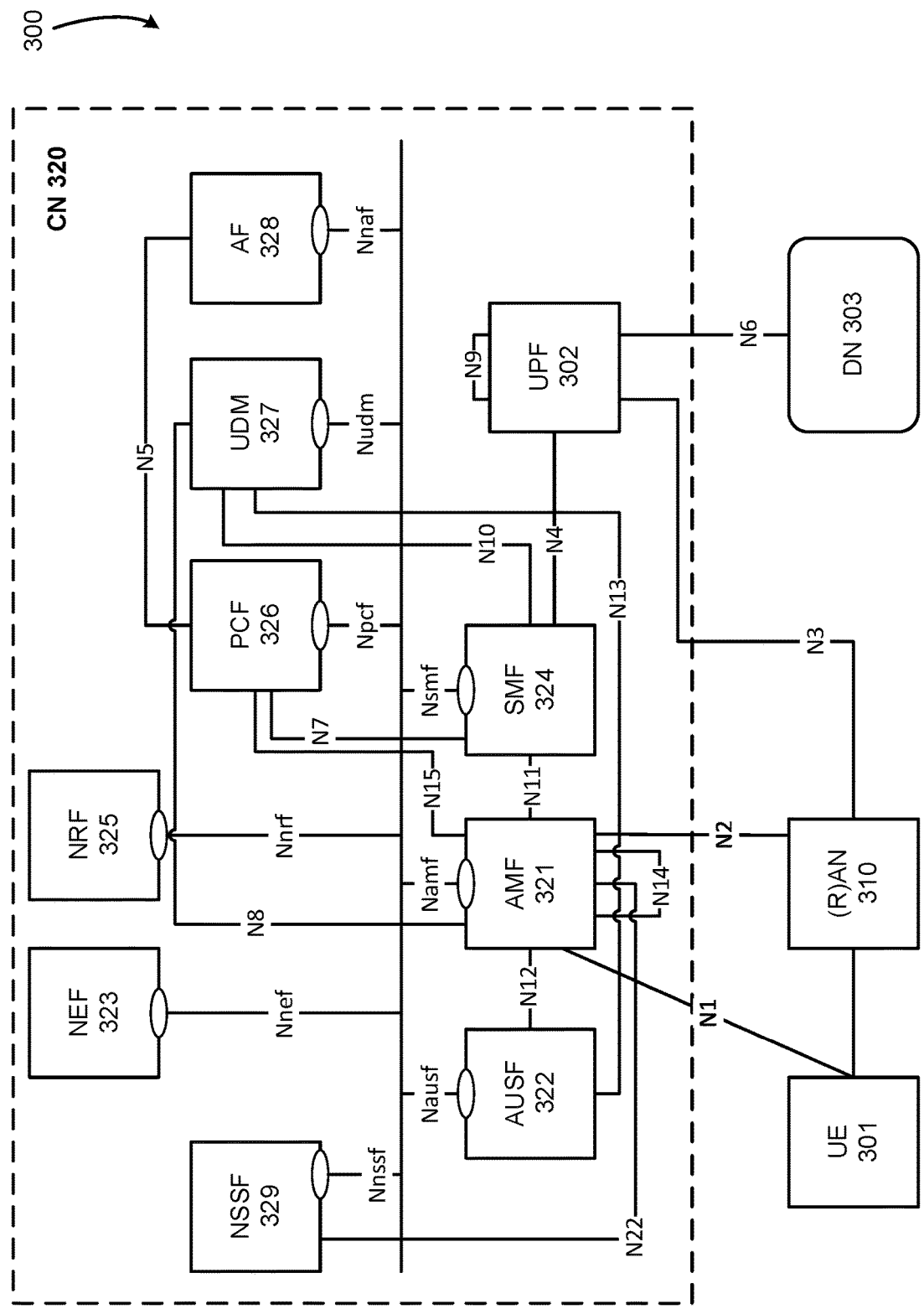
FIG. 3 illustrates an architecture of a system including a second CN in accordance with various embodiments.

FIG. 3 illustrates an architecture of a system 300 including a second CN 320 is shown in accordance with various embodiments. The system 300 is shown to include a UE 301, which may be the same or similar to the UEs 101 and UE 201 discussed previously; a (R)AN 310, which may be the same or similar to the RAN 110 and RAN 210 discussed previously, and which may include RAN nodes 111 discussed previously; and a Data network (DN) 303, which may be, for example, operator services, Internet access or 3rd party services; and a 5G Core Network (5GC or CN) 320.

The 5GC 320 may include an Authentication Server Function (AUSF) 222; an Access and Mobility Management Function (AMF) 321; a Session Management Function (SMF) 324; a Network Exposure Function (NEF) 323; a Policy Control function (PCF) 326; a Network Function (NF) Repository Function (NRF) 325; a Unified Data Management (UDM) 327; an Application Function (AF) 328; a User Plane Function (UPF) 302; and a Network Slice Selection Function (NSSF) 329.

The UPF 302 may act as an anchor point for intra-RAT and inter-RAT mobility, an external PDU session point of interconnect to DN 303, and a branching point to support multi-homed PDU session. The UPF 302 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 302 may include an uplink classifier to support routing traffic flows to a data network. The DN 303 may represent various network operator services, Internet access, or third party services. DN 303 may include, or be similar to application server 130 discussed previously. The UPF 302 may interact with the SMF 324 via an N4 reference point between the SMF 324 and the UPF 302.

The AUSF 322 may store data for authentication of UE 301 and handle authentication related functionality. The AUSF 322 may facilitate a common authentication framework for various access types. The AUSF 322 may communicate with the AMF 321 via an N12 reference point between the AMF 321 and the AUSF 322; and may communicate with the UDM 327 via an N13 reference point between the UDM 327 and the AUSF 322. Additionally, the AUSF 322 may exhibit an Nausf service-based interface.

The AMF 321 may be responsible for registration management (e.g., for registering UE 301, etc.), connection management, reachability management, mobility management, and lawful interception of AMF-related events, and access authentication and authorization. The AMF 321 may be a termination point for the an N11 reference point between the AMF 321 and the SMF 324. The AMF 321 may provide transport for Session Management (SM) messages between the UE 301 and the SMF 324, and act as a transparent proxy for routing SM messages. AMF 321 may also provide transport for short message service (SMS) messages between UE 301 and an SMS function (SMSF) (not shown by FIG. 3). AMF 321 may act as Security Anchor Function (SEA), which may include interaction with the AUSF 322 and the UE 301, receipt of an intermediate key that was established as a result of the UE 301 authentication process. Where USIM based authentication is used, the AMF 321 may retrieve the security material from the AUSF 322. AMF 321 may also include a Security Context Management (SCM) function, which receives a key from the SEA that it uses to derive access-network specific keys. Furthermore, AMF 321 may be a termination point of RAN CP interface, which may include or be an N2 reference point between the (R)AN 311 and the AMF 321; and the AMF 321 may be a termination point of NAS (N1) signalling, and perform NAS ciphering and integrity protection.

AMF 321 may also support NAS signalling with a UE 301 over an N3 interworking-function (IWF) interface. The N3IWF may be used to provide access to untrusted entities. N3IWF may be a termination point for the N2 interface between the (R)AN 310 and the AMF 321 for the control plane, and may be a termination point for the N3 reference point between the (R)AN 310 and the UPF 302 for the user plane. As such, the AMF 321 may handle N2 signalling from the SMF 324 and the AMF 321 for PDU sessions and QoS, encapsulate/de-encapsulate packets for IPSec and N3 tunnelling, mark N3 user-plane packets in the uplink, and enforce QoS corresponding to N3 packet marking taking into account QoS requirements associated to such marking received over N2. N3IWF may also relay uplink and downlink control-plane NAS signalling between the UE 301 and AMF 321 via an N1 reference point between the UE 301 and the AMF 321, and relay uplink and downlink user-plane packets between the UE 301 and UPF 302. The N3IWF also provides mechanisms for IPsec tunnel establishment with the UE 301. The AMF 321 may exhibit an Namf service-based interface, and may be a termination point for an N14 reference point between two AMFs 321 and an N17 reference point between the AMF 321 and a 5G-Equipment Identity Register (5G-EIR) (not shown by FIG. 3).

The UE 301 may need to register with the AMF 321 in order to receive network services. Registration Management (RM) is used to register or deregister the UE 301 with the network (e.g., AMF 321), and establish a UE context in the network (e.g., AMF 321). The UE 301 may operate in an RM-REGISTERED state or an RM-DEREGISTERED state. In the RM-DEREGISTERED state, the UE 301 is not registered with the network, and the UE context in AMF 321 holds no valid location or routing information for the UE 301 so the UE 301 is not reachable by the AMF 321. In the RM-REGISTERED state, the UE 301 is registered with the network, and the UE context in AMF 321 may hold a valid location or routing information for the UE 301 so the UE 301 is reachable by the AMF 321. In the RM-REGISTERED state, the UE 301 may perform mobility Registration Update procedures, perform periodic Registration Update procedure triggered by expiration of the periodic update timer (e.g., to notify the network that the UE 301 is still active), and perform a Registration Update procedure to update UE capability information or to re-negotiate protocol parameters with the network, among others.

The AMF 321 may store one or more RM contexts for the UE 301, where each RM context is associated with a specific access to the network. The RM context may be a data structure, database object, etc. that indicates or stores, inter alia, a registration state per access type and the periodic update timer. The AMF 321 may also store a 5GC MM context that may be the same or similar to the (E)MM context discussed previously. In various embodiments, the AMF 321 may store a CE mode B Restriction parameter of the UE 301 in an associated MM context or RM context. The AMF 321 may also derive the value, when needed, from the UE's usage setting parameter {possible values: "Data Centric", "Voice Centric"} already stored in the UE context (and/or MM/RM Context).

Connection Management (CM) may be used to establish and release a signaling connection between the UE 301 and the AMF 321 over the N1 interface. The signaling connection is used to enable NAS signaling exchange between the UE 301 and the CN 120, and comprises both the AN signaling connection between the UE and the Access Network (AN) (e.g., RRC connection or UE-N3IWF connection for Non-3GPP access) and the N2 connection for the UE 301 between the AN (e.g., RAN 310) and the AMF 321. The UE 301 may operate in one of two CM states, CM-IDLE mode or CM-CONNECTED mode. When the UE 301 is operating in the CM-IDLE state/mode, the UE 301 may have no NAS signaling connection established with the AMF 321 over the N1 interface, and there may be (R)AN 310 signaling connection (e.g., N2 and/or N3 connections) for the UE 301. When the UE 301 is operating in the CM-CONNECTED state/mode, the UE 301 may have an established NAS signaling connection with the AMF 321 over the N1 interface, and there may be a (R)AN 310 signaling connection (e.g., N2 and/or N3 connections) for the UE 301. Establishment of an N2 connection between the (R)AN 310 and the AMF 321 may cause the UE 301 to transition from CM-IDLE mode to CM-CONNECTED mode, and the UE 301 may transition from the CM-CONNECTED mode to the CM-IDLE mode when N2 signaling between the (R)AN 310 and the AMF 321 is released.

The SMF 324 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 324 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signalling for PDU session authorization/authentication by external DN. An N16 reference point between two SMFs 324 may be included in the system 300, which may be between another SMF 324 in a visited network and the SMF 324 in the home network in roaming scenarios. Additionally, the SMF 324 may exhibit the Nsmf service-based interface.

The NEF 323 may provide means for securely exposing the services and capabilities provided by 3GPP network functions for third party, internal exposure/re-exposure, Application Functions (e.g., AF 328), edge computing or fog computing systems, etc. In such embodiments, the NEF 323 may authenticate, authorize, and/or throttle the AFs. NEF 323 may also translate information exchanged with the AF 328 and information exchanged with internal network functions. For example, the NEF 323 may translate between an AF-Service-Identifier and an internal 5GC information. NEF 323 may also receive information from other network functions (NFs) based on exposed capabilities of other network functions. This information may be stored at the NEF 323 as structured data, or at a data storage NF using a standardized interfaces. The stored information can then be re-exposed by the NEF 323 to other NFs and AFs, and/or used for other purposes such as analytics. Additionally, the NEF 323 may exhibit an Nnef service-based interface.

The NRF 325 may support service discovery functions, receive NF Discovery Requests from NF instances, and provide the information of the discovered NF instances to the NF instances. NRF 325 also maintains information of available NF instances and their supported services. As used herein, the terms "instantiate", "instantiation", and the like may refer to the creation of an instance, and an "instance" may refer to a concrete occurrence of an object, which may occur, for example, during execution of program code. Additionally, the NRF 325 may exhibit the Nnrf service-based interface.

The PCF 326 may provide policy rules to control plane function(s) to enforce them, and may also support unified policy framework to govern network behaviour. The PCF 326 may also implement a front end (FE) to access subscription information relevant for policy decisions in a UDR of the UDM 327. The PCF 326 may communicate with the AMF 321 via an N15 reference point between the PCF 326 and the AMF 321, which may include a PCF 326 in a visited network and the AMF 321 in case of roaming scenarios. The PCF 326 may communicate with the AF 328 via an N5 reference point between the PCF 326 and the AF 328; and with the SMF 324 via an N7 reference point between the PCF 326 and the SMF 324. The system 200 and/or CN 120 may also include an N24 reference point between the PCF 326 (in the home network) and a PCF 326 in a visited network. Additionally, the PCF 326 may exhibit an Npcf service-based interface.

The UDM 327 may handle subscription-related information to support the network entities' handling of communication sessions, and may store subscription data of UE 301. For example, subscription data may be communicated between the UDM 327 and the AMF 321 via an N8 reference point between the UDM 327 and the AMF 321 (not shown by FIG. 3). The UDM 327 may include two parts, an application FE and a User Data Repository (UDR) (the FE and UDR are not shown by FIG. 3). The UDR may store subscription data and policy data for the UDM 327 and the PCF 326, and/or structured data for exposure and application data (including Packet Flow Descriptions (PFDs) for application detection, application request information for multiple UEs 201) for the NEF 323. The Nudr service-based interface may be exhibited by the UDR 221 to allow the UDM 327, PCF 326, and NEF 323 to access a particular set of the stored data, as well as to read, update (e.g., add, modify), delete, and subscribe to notification of relevant data changes in the UDR. The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with the SMF 324 via an N10 reference point between the UDM 327 and the SMF 324. UDM 327 may also support SMS management, wherein an SMS-FE implements the similar application logic as discussed previously. Additionally, the UDM 327 may exhibit the Nudm service-based interface.

The AF 328 may provide application influence on traffic routing, access to the Network Capability Exposure (NCE), and interact with the policy framework for policy control. The NCE may be a mechanism that allows the 5GC 320 and AF 328 to provide information to each other via NEF 323, which may be used for edge computing implementations. In such implementations, the network operator and third party services may be hosted close to the UE 301 access point of attachment to achieve an efficient service delivery through the reduced end-to-end latency and load on the transport network. For edge computing implementations, the 5GC may select a UPF 302 close to the UE 301 and execute traffic steering from the UPF 302 to DN 303 via the N6 interface. This may be based on the UE subscription data, UE location, and information provided by the AF 328. In this way, the AF 328 may influence UPF (re)selection and traffic routing. Based on operator deployment, when AF 328 is considered to be a trusted entity, the network operator may permit AF 328 to interact directly with relevant NFs. Additionally, the AF 328 may exhibit an Naf service-based interface.

The NSSF 329 may select a set of network slice instances serving the UE 301. The NSSF 329 may also determine allowed Network Slice Selection Assistance Information (NSSAI) and the mapping to the Subscribed Single-NSSAIs (S-NSSAIs), if needed. The NSSF 329 may also determine the AMF set to be used to serve the UE 301, or a list of candidate AMF(s) 221 based on a suitable configuration and possibly by querying the NRF 325. The selection of a set of network slice instances for the UE 301 may be triggered by the AMF 321 with which the UE 301 is registered by interacting with the NSSF 329, which may lead to a change of AMF 321. The NSSF 329 may interact with the AMF 321 via an N22 reference point between AMF 321 and NSSF 329; and may communicate with another NSSF 329 in a visited network via an N31 reference point (not shown by FIG. 3). Additionally, the NSSF 329 may exhibit an Nnssf service-based interface.

As discussed previously, the CN 320 may include an SMSF, which may be responsible for SMS subscription checking and verification, and relaying SM messages to/from the UE 301 to/from other entities, such as an SMS-GMSC/IWMSC/SMS-router. The SMS may also interact with AMF 321 and UDM 327 for notification procedure that the UE 301 is available for SMS transfer (e.g., set a UE not reachable flag, and notifying UDM 327 when UE 301 is available for SMS).

The CN 120 may also include other elements that are not shown by FIG. 3, such as a Data Storage system/architecture, a 5G-Equipment Identity Register (5G-EIR), a Security Edge Protection Proxy (SEPP), and the like. The Data Storage system may include a Structured Data Storage network function (SDSF), an Unstructured Data Storage network function (UDSF), and/or the like. Any NF may store and retrieve unstructured data into/from the UDSF (e.g., UE contexts), via N18 reference point between any NF and the UDSF (not shown by FIG. 3). Individual NFs may share a UDSF for storing their respective unstructured data or individual NFs may each have their own UDSF located at or near the individual NFs. Additionally, the UDSF may exhibit an Nudsf service-based interface (not shown by FIG. 3). The 5G-EIR may be an NF that checks the status of Permanent Equipment Identifiers (PEI) for determining whether particular equipment/entities are blacklisted from the network; and the SEPP may be a non-transparent proxy that performs topology hiding, message filtering, and policing on inter-PLMN control plane interfaces.

Additionally, there may be many more reference points and/or service-based interfaces between the NF services in the NFs; however, these interfaces and reference points have been omitted from FIG. 3 for clarity. In one example, the CN 320 may include an Nx interface, which is an inter-CN interface between the MME (e.g., MME 221) and the AMF 321 in order to enable interworking between CN 320 and CN 220. Other example interfaces/reference points may include an N5g-eir service-based interface exhibited by a 5G-EIR, an N27 reference point between NRF in the visited network and the NRF in the home network; and an N31 reference point between the NSSF in the visited network and the NSSF in the home network.

Figure 4:
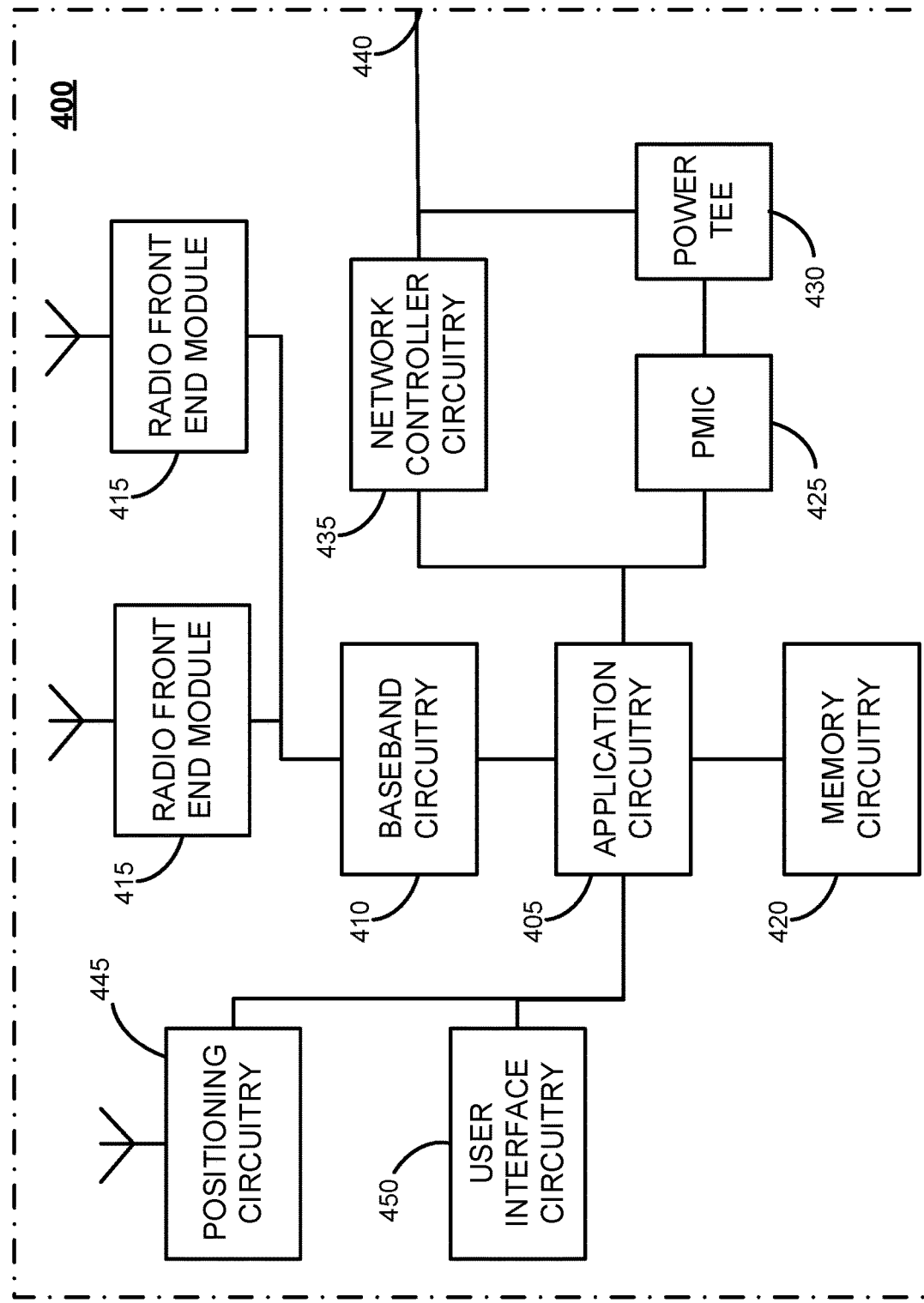
FIG. 4 illustrates an example of infrastructure equipment in accordance with various embodiments.

FIG. 4 illustrates an example of infrastructure equipment 400 in accordance with various embodiments. The infrastructure equipment 400 (or "system 400") may be implemented as a base station, radio head, RAN node, etc., such as the RAN nodes 111 and/or AP 106 shown and described previously. In other examples, the system 400 could be implemented in or by a UE, application server(s) 130, and/or any other element/device discussed herein. The system 400 may include one or more of application circuitry 405, baseband circuitry 410, one or more radio front end modules 415, memory 420, power management integrated circuitry (PMIC) 425, power tee circuitry 430, network controller 435, network interface connector 440, satellite positioning circuitry 445, and user interface 450. In some embodiments, the device 500 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (e.g., a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The terms "application circuitry" and/or "baseband circuitry" may be considered synonymous to, and may be referred to as "processor circuitry." As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

Furthermore, the various components of the core network 120 (or CN 30 discussed infra) may be referred to as "network elements." The term "network element" may describe a physical or virtualized equipment used to provide wired or wireless communication network services. The term "network element" may be considered synonymous to and/or referred to as a networked computer, networking hardware, network equipment, network node, router, switch, hub, bridge, radio network controller, radio access network device, gateway, server, virtualized network function (VNF), network functions virtualization infrastructure (NFVI), and/or the like.

Application circuitry 405 may include one or more central processing unit (CPU) cores and one or more of cache memory, low drop-out voltage regulators (LDOs), interrupt controllers, serial interfaces such as SPI, FC or universal programmable serial interface module, real time clock (RTC), timer-counters including interval and watchdog timers, general purpose input/output (I/O or JO), memory card controllers such as Secure Digital (SD/)MultiMediaCard (MMC) or similar, Universal Serial Bus (USB) interfaces, Mobile Industry Processor Interface (MIPI) interfaces and Joint Test Access Group (JTAG) test access ports. As examples, the application circuitry 405 may include one or more Intel Pentium®, Core®, or Xeon® processor(s); Advanced Micro Devices (AMD) Ryzen® processor(s), Accelerated Processing Units (APUs), or Epyc® processors; and/or the like. In some embodiments, the system 400 may not utilize application circuitry 405, and instead may include a special-purpose processor/controller to process IP data received from an EPC or 5GC, for example.

Additionally or alternatively, application circuitry 405 may include circuitry such as, but not limited to, one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 405 may comprise logic blocks or logic fabric including and other interconnected resources that may be programmed to perform various functions, such as the procedures, methods, functions, etc. of the various embodiments discussed herein. In such embodiments, the circuitry of application circuitry 405 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry 410 may be implemented, for example, as a solder-down substrate including one or more integrated circuits, a single packaged integrated circuit soldered to a main circuit board or a multi-chip module containing two or more integrated circuits. Although not shown, baseband circuitry 410 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 410 may include protocol processing circuitry with one or more instances of control circuitry (not shown) to provide control functions for the digital baseband circuitry and/or radio frequency circuitry (e.g., the radio front end modules 415).

User interface circuitry 450 may include one or more user interfaces designed to enable user interaction with the system 400 or peripheral component interfaces designed to enable peripheral component interaction with the system 400. User interfaces may include, but are not limited to one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a non-volatile memory port, a universal serial bus (USB) port, an audio jack, a power supply interface, etc.

The radio front end modules (RFEMs) 415 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 415. The RFEMs 415 may incorporate both millimeter wave antennas and sub-millimeter wave antennas.

The memory circuitry 420 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 420 may be implemented as one or more of solder down packaged integrated circuits, socketed memory modules and plug-in memory cards.

The PMIC 425 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 430 may provide for electrical power drawn from a network cable to provide both power supply and data connectivity to the infrastructure equipment 400 using a single cable.

The network controller circuitry 435 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 400 via network interface connector 440 using a physical connection, which may be electrical (commonly referred to as a "copper interconnect"), optical, or wireless. The network controller circuitry 435 may include one or more dedicated processors and/or FPGAs to communicate using one or more of the aforementioned protocol. In some implementations, the network controller circuitry 435 may include multiple controllers to provide connectivity to other networks using the same or different protocols.

The positioning circuitry 445, which may include circuitry to receive and decode signals transmitted by one or more navigation satellite constellations of a global navigation satellite system (GNSS). Examples of navigation satellite constellations (or GNSS) may include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 445 may comprise various hardware elements (e.g., including hardware devices such as switches, filters, amplifiers, antenna elements, and the like to facilitate the communications over-the-air (OTA) communications) to communicate with components of a positioning network, such as navigation satellite constellation nodes.

Nodes or satellites of the navigation satellite constellation(s) ("GNSS nodes") may provide positioning services by continuously transmitting or broadcasting GNSS signals along a line of sight, which may be used by GNSS receivers (e.g., positioning circuitry 445 and/or positioning circuitry implemented by UEs 101, 102, or the like) to determine their GNSS position. The GNSS signals may include a pseudorandom code (e.g., a sequence of ones and zeros) that is known to the GNSS receiver and a message that includes a time of transmission (ToT) of a code epoch (e.g., a defined point in the pseudorandom code sequence) and the GNSS node position at the ToT. The GNSS receivers may monitor/measure the GNSS signals transmitted/broadcasted by a plurality of GNSS nodes (e.g., four or more satellites) and solve various equations to determine a corresponding GNSS position (e.g., a spatial coordinate). The GNSS receivers also implement clocks that are typically less stable and less precise than the atomic clocks of the GNSS nodes, and the GNSS receivers may use the measured GNSS signals to determine the GNSS receivers' deviation from true time (e.g., an offset of the GNSS receiver clock relative to the GNSS node time). In some embodiments, the positioning circuitry 445 may include a Micro-Technology for Positioning, Navigation, and Timing (Micro-PNT) IC that uses a master timing clock to perform position tracking/estimation without GNSS assistance.

The GNSS receivers may measure the time of arrivals (ToAs) of the GNSS signals from the plurality of GNSS nodes according to its own clock. The GNSS receivers may determine ToF values for each received GNSS signal from the ToAs and the ToTs, and then may determine, from the ToFs, a three-dimensional (3D) position and clock deviation. The 3D position may then be converted into a latitude, longitude and altitude. The positioning circuitry 445 may provide data to application circuitry 405 which may include one or more of position data or time data. Application circuitry 405 may use the time data to synchronize operations with other radio base stations (e.g., RAN nodes 111 or the like).

The components shown by FIG. 4 may communicate with one another using interface circuitry. As used herein, the term "interface circuitry" may refer to, is part of, or includes circuitry providing for the exchange of information between two or more components or devices. The term "interface circuitry" may refer to one or more hardware interfaces, for example, buses, input/output (I/O) interfaces, peripheral component interfaces, network interface cards, and/or the like. Any suitable bus technology may be used in various implementations, which may include any number of technologies, including industry standard architecture (ISA), extended ISA (EISA), peripheral component interconnect (PCI), peripheral component interconnect extended (PCIx), PCI express (PCIe), or any number of other technologies. The bus may be a proprietary bus, for example, used in a SoC based system. Other bus systems may be included, such as an FC interface, an SPI interface, point to point interfaces, and a power bus, among others.

Figure 5:
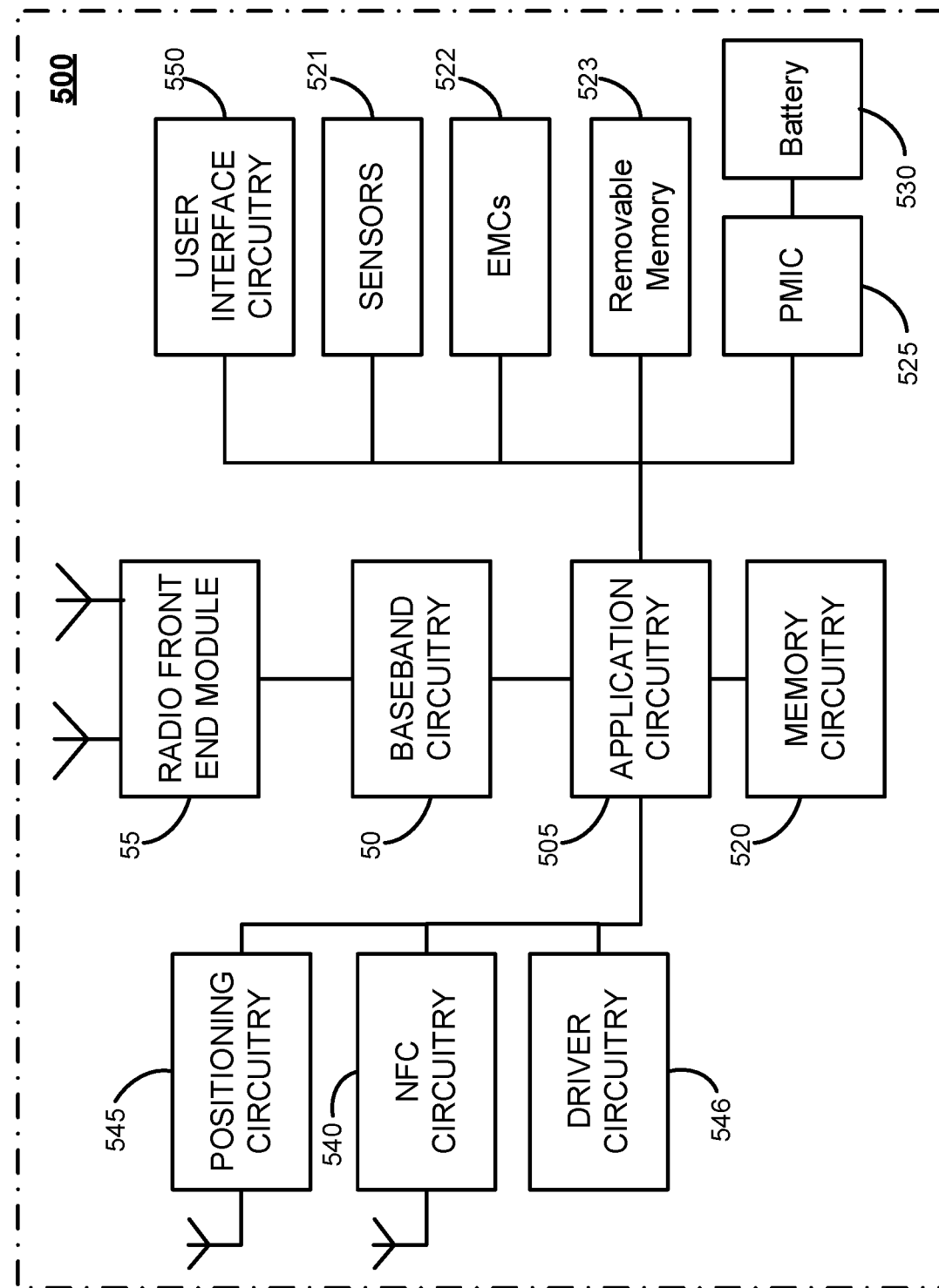
FIG. 5 illustrates an example of a platform (or "device") in accordance with various embodiments.

FIG. 5 illustrates an example of a platform 500 (or "device 500") in accordance with various embodiments. In embodiments, the computer platform 500 may be suitable for use as UEs 101, 102, 201, application servers 130, and/or any other element/device discussed herein. The platform 500 may include any combinations of the components shown in the example. The components of platform 500 may be implemented as integrated circuits (ICs), portions thereof, discrete electronic devices, or other modules, logic, hardware, software, firmware, or a combination thereof adapted in the computer platform 500, or as components otherwise incorporated within a chassis of a larger system. The block diagram of FIG. 5 is intended to show a high level view of components of the computer platform 500. However, some of the components shown may be omitted, additional components may be present, and different arrangement of the components shown may occur in other implementations.

The application circuitry 505 may include circuitry such as, but not limited to single-core or multi-core processors and one or more of cache memory, low drop-out voltage regulators (LDOs), interrupt controllers, serial interfaces such as serial peripheral interface (SPI), inter-integrated circuit ($I^2C$) or universal programmable serial interface circuit, real time clock (RTC), timer-counters including interval and watchdog timers, general purpose input-output (TO), memory card controllers such as secure digital/multimedia card (SD/MMC) or similar, universal serial bus (USB) interfaces, mobile industry processor interface (MIPI) interfaces and Joint Test Access Group (JTAG) test access ports. The processor(s) may include any combination of general-purpose processors and/or dedicated processors (e.g., graphics processors, application processors, etc.). The processors (or cores) may be coupled with or may include memory/storage and may be configured to execute instructions stored in the memory/storage to enable various applications or operating systems to run on the platform 500. In some embodiments, processors of application circuitry 405/505 may process IP data packets received from an EPC or 5GC.

Application circuitry 505 be or include a microprocessor, a multi-core processor, a multithreaded processor, an ultralow voltage processor, an embedded processor, or other known processing element. In one example, the application circuitry 505 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 505 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc; an ARM-based design licensed from ARM Holdings, Ltd.; or the like. In some implementations, the application circuitry 505 may be a part of a system on a chip (SoC) in which the application circuitry 505 and other components are formed into a single integrated circuit, or a single package, such as the Edison™ or Galileo™ SoC boards from Intel® Corporation.

Additionally or alternatively, application circuitry 505 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 505 may comprise logic blocks or logic fabric including and other interconnected resources that may be programmed to perform various functions, such as the procedures, methods, functions, etc. of the various embodiments discussed herein. In such embodiments, the circuitry of application circuitry 505 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The baseband circuitry 50 may be implemented, for example, as a solder-down substrate including one or more integrated circuits, a single packaged integrated circuit soldered to a main circuit board or a multi-chip module containing two or more integrated circuits. Although not shown, baseband circuitry 50 may comprise one or more digital baseband systems, which may be coupled via an interconnect subsystem to a CPU subsystem, an audio subsystem, and an interface subsystem. The digital baseband subsystems may also be coupled to a digital baseband interface and a mixed-signal baseband sub-system via another interconnect subsystem. Each of the interconnect subsystems may include a bus system, point-to-point connections, network-on-chip (NOC) structures, and/or some other suitable bus or interconnect technology, such as those discussed herein. The audio sub-system may include digital signal processing circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 50 may include protocol processing circuitry with one or more instances of control circuitry (not shown) to provide control functions for the digital baseband circuitry and/or radio frequency circuitry (e.g., the radio front end modules 55).

The radio front end modules (RFEMs) 55 may comprise a millimeter wave RFEM and one or more sub-millimeter wave radio frequency integrated circuits (RFICs). In some implementations, the one or more sub-millimeter wave RFICs may be physically separated from the millimeter wave RFEM. The RFICs may include connections to one or more antennas or antenna arrays, and the RFEM may be connected to multiple antennas. In alternative implementations, both millimeter wave and sub-millimeter wave radio functions may be implemented in the same physical radio front end module 55. The RFEMs 55 may incorporate both millimeter wave antennas and sub-millimeter wave antennas.

The memory circuitry 60 may include any number and type of memory devices used to provide for a given amount of system memory. As examples, the memory circuitry 60 may include one or more of volatile memory including be random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 60 may be developed in accordance with a Joint Electron Devices Engineering Council (JEDEC) low power double data rate (LPDDR)-based design, such as LPDDR2, LPDDR3, LPDDR4, or the like. Memory circuitry 420 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 60 may be on-die memory or registers associated with the application circuitry 505. To provide for persistent storage of information such as data, applications, operating systems and so forth, memory circuitry 60 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 500 may incorporate the three-dimensional (3D) cross-point (XPOINT) memories from Intel® and Micron®.

Removable memory circuitry 63 may include devices, circuitry, enclosures/housings, ports or receptacles, etc. used to coupled portable data storage devices with the platform 500. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 500 may also include interface circuitry (not shown) that is used to connect external devices with the platform 500. The external devices connected to the platform 500 via the interface circuitry may include sensors 521, such as accelerometers, level sensors, flow sensors, temperature sensors, pressure sensors, barometric pressure sensors, and the like. The interface circuitry may be used to connect the platform 500 to electro-mechanical components (EMCs) 522, which may allow platform 500 to change its state, position, and/or orientation, or move or control a mechanism or system. The EMCs 522 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 500 may be configured to operate one or more EMCs 522 based on one or more captured events and/or instructions or control signals received from a service provider and/or various clients.

In some implementations, the interface circuitry may connect the platform 500 with positioning circuitry 545, which may be the same or similar as the positioning circuitry 545 discussed with regard to FIG. 4.

In some implementations, the interface circuitry may connect the platform 500 with near-field communication (NFC) circuitry 540, which may include an NFC controller coupled with an antenna element and a processing device. The NFC circuitry 540 may be configured to read electronic tags and/or connect with another NFC-enabled device.

The driver circuitry 546 may include software and hardware elements that operate to control particular devices that are embedded in the platform 500, attached to the platform 500, or otherwise communicatively coupled with the platform 500. The driver circuitry 546 may include individual drivers allowing other components of the platform 500 to interact or control various input/output (I/O) devices that may be present within, or connected to, the platform 500. For example, driver circuitry 546 may include a display driver to control and allow access to a display device, a touchscreen driver to control and allow access to a touchscreen interface of the platform 500, sensor drivers to obtain sensor readings of sensors 521 and control and allow access to sensors 521, EMC drivers to obtain actuator positions of the EMCs 522 and/or control and allow access to the EMCs 522, a camera driver to control and allow access to an embedded image capture device, audio drivers to control and allow access to one or more audio devices.

The power management integrated circuitry (PMIC) 525 (also referred to as "power management circuitry 525") may manage power provided to various components of the platform 500. In particular, with respect to the baseband circuitry 50, the PMIC 525 may control power-source selection, voltage scaling, battery charging, or DC-to-DC conversion. The PMIC 525 may often be included when the platform 500 is capable of being powered by a battery 530, for example, when the device is included in a UE 101, 102, XR01.

In some embodiments, the PMIC 525 may control, or otherwise be part of, various power saving mechanisms of the platform 500. For example, if the platform 500 is in an RRC Connected state, where it is still connected to the RAN node as it expects to receive traffic shortly, then it may enter a state known as Discontinuous Reception Mode (DRX) after a period of inactivity. During this state, the platform 500 may power down for brief intervals of time and thus save power. If there is no data traffic activity for an extended period of time, then the platform 500 may transition off to an RRC Idle state, where it disconnects from the network and does not perform operations such as channel quality feedback, handover, etc. The platform 500 goes into a very low power state and it performs paging where again it periodically wakes up to listen to the network and then powers down again. The platform 500 may not receive data in this state, in order to receive data, it must transition back to RRC Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 530 may power the platform 500, although in some examples the platform 500 may be mounted deployed in a fixed location, and may have a power supply coupled to an electrical grid. The battery 530 may be a lithium ion battery, a metal-air battery, such as a zinc-air battery, an aluminum-air battery, a lithium-air battery, and the like. In some implementations, such as in V2X applications, the battery 530 may be a typical lead-acid automotive battery.

In some implementations, the battery 530 may be a "smart battery," which includes or is coupled with a Battery Management System (BMS) or battery monitoring integrated circuitry. The BMS may be included in the platform 500 to track the state of charge (SoCh) of the battery 530. The BMS may be used to monitor other parameters of the battery 530 to provide failure predictions, such as the state of health (SoH) and the state of function (SoF) of the battery 530. The BMS may communicate the information of the battery 530 to the application circuitry 505 or other components of the platform 500. The BMS may also include an analog-to-digital (ADC) convertor that allows the application circuitry 505 to directly monitor the voltage of the battery 530 or the current flow from the battery 530. The battery parameters may be used to determine actions that the platform 500 may perform, such as transmission frequency, network operation, sensing frequency, and the like.

A power block, or other power supply coupled to an electrical grid may be coupled with the BMS to charge the battery 530. In some examples, the power block 128 may be replaced with a wireless power receiver to obtain the power wirelessly, for example, through a loop antenna in the computer platform 500. In these examples, a wireless battery charging circuit may be included in the BMS. The specific charging circuits chosen may depend on the size of the battery 530, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Although not shown, the components of platform 500 may communicate with one another using a suitable bus technology, which may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus may be a proprietary bus, for example, used in a SoC based system. Other bus systems may be included, such as an I²C interface, an SPI interface, point to point interfaces, and a power bus, among others.

Figure 6:
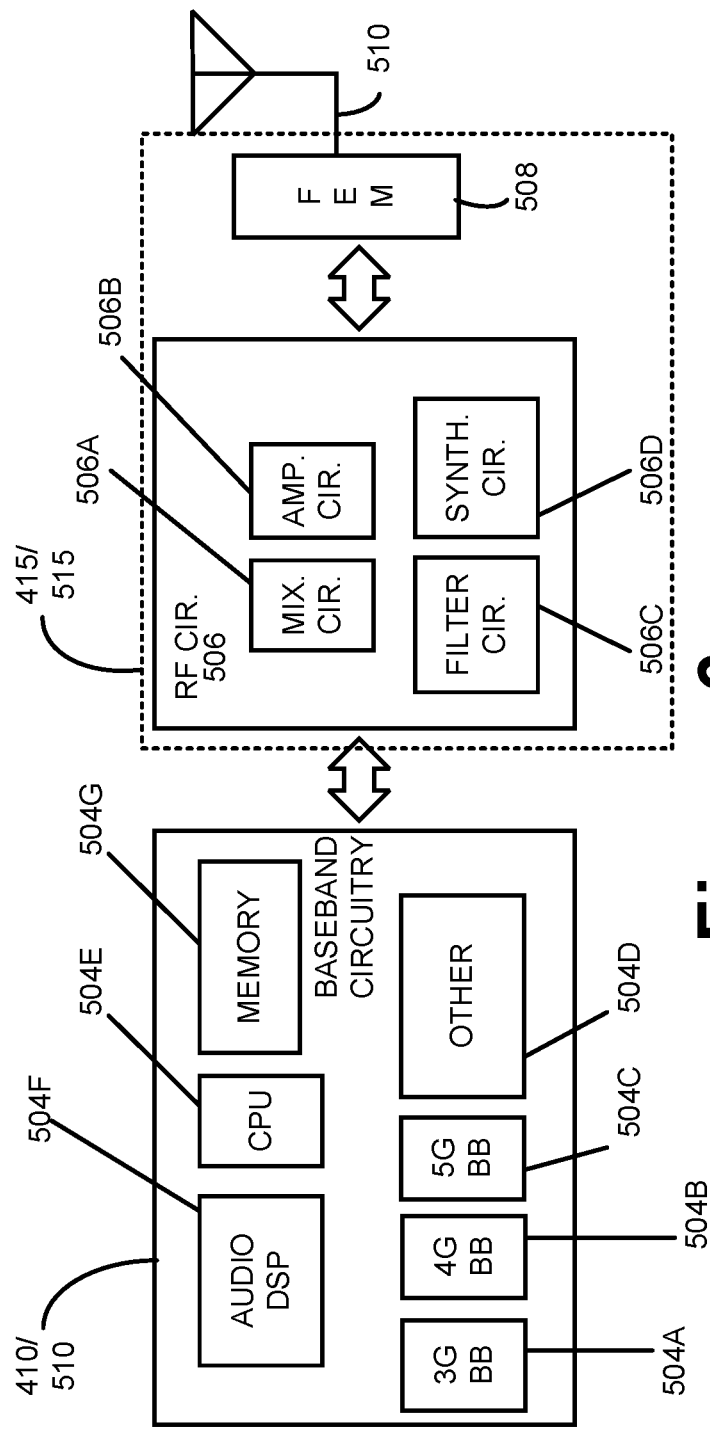
FIG. 6 illustrates example components of baseband circuitry and radio front end modules (RFEM) in accordance with various embodiments.

FIG. 6 illustrates example components of baseband circuitry 410/50 and radio front end modules (RFEM) 415/55 in accordance with various embodiments. As shown, the RFEM 415/55 may include Radio Frequency (RF) circuitry 506, front-end module (FEM) circuitry 508, one or more antennas 50 coupled together at least as shown.

The baseband circuitry 410/50 may include circuitry such as, but not limited to, one or more single-core or multi-core processors. The baseband circuitry 410/50 may include one or more baseband processors or control logic to process baseband signals received from a receive signal path of the RF circuitry 506 and to generate baseband signals for a transmit signal path of the RF circuitry 506. Baseband processing circuitry 410/50 may interface with the application circuitry 405/505 for generation and processing of the baseband signals and for controlling operations of the RF circuitry 506. For example, in some embodiments, the baseband circuitry 410/50 may include a third generation (3G) baseband processor 504A, a fourth generation (4G) baseband processor 504B, a fifth generation (5G) baseband processor 504C, or other baseband processor(s) 504D for other existing generations, generations in development or to be developed in the future (e.g., second generation (2G), sixth generation (6G), etc.). The baseband circuitry 410/50 (e.g., one or more of baseband processors 504A-D) may handle various radio control functions that enable communication with one or more radio networks via the RF circuitry 506. In other embodiments, some or all of the functionality of baseband processors 504A-D may be included in modules stored in the memory 504G and executed via a Central Processing Unit (CPU) 504E. The radio control functions may include, but are not limited to, signal modulation/demodulation, encoding/decoding, radio frequency shifting, etc. In some embodiments, modulation/demodulation circuitry of the baseband circuitry 410/50 may include Fast-Fourier Transform (FFT), precoding, or constellation mapping/demapping functionality. In some embodiments, encoding/decoding circuitry of the baseband circuitry 410/50 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 410/50 may include one or more audio digital signal processor(s) (DSP) 504F. The audio DSP(s) 504F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 410/50 and the application circuitry 405/505 may be implemented together such as, for example, on a system on a chip (SOC).

In some embodiments, the baseband circuitry 410/50 may provide for communication compatible with one or more radio technologies. For example, in some embodiments, the baseband circuitry 410/50 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 410/50 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. RF circuitry 506 may include a receive signal path which may include circuitry to down-convert RF signals received from the FEM circuitry 508 and provide baseband signals to the baseband circuitry 410/50. RF circuitry 506 may also include a transmit signal path which may include circuitry to up-convert baseband signals provided by the baseband circuitry 410/50 and provide RF output signals to the FEM circuitry 508 for transmission.

In some embodiments, the receive signal path of the RF circuitry 506 may include mixer circuitry 506a, amplifier circuitry 506b and filter circuitry 506c. In some embodiments, the transmit signal path of the RF circuitry 506 may include filter circuitry 506c and mixer circuitry 506a. RF circuitry 506 may also include synthesizer circuitry 506d for synthesizing a frequency for use by the mixer circuitry 506a of the receive signal path and the transmit signal path. In some embodiments, the mixer circuitry 506*a* of the receive signal path may be configured to down-convert RF signals received from the FEM circuitry 508 based on the synthesized frequency provided by synthesizer circuitry 506*d*. The amplifier circuitry 506*b* may be configured to amplify the down-converted signals and the filter circuitry 506*c* may be a low-pass filter (LPF) or band-pass filter (BPF) configured to remove unwanted signals from the down-converted signals to generate output baseband signals. Output baseband signals may be provided to the baseband circuitry 410/50 for further processing. In some embodiments, the output baseband signals may be zero-frequency baseband signals, although this is not a requirement. In some embodiments, mixer circuitry 506*a* of the receive signal path may comprise passive mixers, although the scope of the embodiments is not limited in this respect.

In some embodiments, the mixer circuitry 506*a* of the transmit signal path may be configured to up-convert input baseband signals based on the synthesized frequency provided by the synthesizer circuitry 506*d* to generate RF output signals for the FEM circuitry 508. The baseband signals may be provided by the baseband circuitry 410/50 and may be filtered by filter circuitry 506*c*.

In some embodiments, the mixer circuitry 506*a* of the receive signal path and the mixer circuitry 506*a* of the transmit signal path may include two or more mixers and may be arranged for quadrature downconversion and upconversion, respectively. In some embodiments, the mixer circuitry 506*a* of the receive signal path and the mixer circuitry 506*a* of the transmit signal path may include two or more mixers and may be arranged for image rejection (e.g., Hartley image rejection). In some embodiments, the mixer circuitry 506*a* of the receive signal path and the mixer circuitry 506*a* may be arranged for direct downconversion and direct upconversion, respectively. In some embodiments, the mixer circuitry 506*a* of the receive signal path and the mixer circuitry 506*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 410/50 may include a digital baseband interface to communicate with the RF circuitry 506.

In some dual-mode embodiments, a separate radio IC circuitry may be provided for processing signals for each spectrum, although the scope of the embodiments is not limited in this respect.

In some embodiments, the synthesizer circuitry 506*d* may be a fractional-N synthesizer or a fractional N/N+1 synthesizer, although the scope of the embodiments is not limited in this respect as other types of frequency synthesizers may be suitable. For example, synthesizer circuitry 506*d* may be a delta-sigma synthesizer, a frequency multiplier, or a synthesizer comprising a phase-locked loop with a frequency divider.

The synthesizer circuitry 506*d* may be configured to synthesize an output frequency for use by the mixer circuitry 506*a* of the RF circuitry 506 based on a frequency input and a divider control input. In some embodiments, the synthesizer circuitry 506*d* may be a fractional N/N+1 synthesizer.

In some embodiments, frequency input may be provided by a voltage controlled oscillator (VCO), although that is not a requirement. Divider control input may be provided by either the baseband circuitry 410/50 or the applications processor 405/505 depending on the desired output frequency. In some embodiments, a divider control input (e.g., N) may be determined from a look-up table based on a channel indicated by the applications processor 405/505.

Synthesizer circuitry 506*d* of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 506*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include a receive signal path which may include circuitry configured to operate on RF signals received from one or more antennas 50, amplify the received signals and provide the amplified versions of the received signals to the RF circuitry 506 for further processing. FEM circuitry 508 may also include a transmit signal path which may include circuitry configured to amplify signals for transmission provided by the RF circuitry 506 for transmission by one or more of the one or more antennas 50. In various embodiments, the amplification through the transmit or receive signal paths may be done solely in the RF circuitry 506, solely in the FEM 508, or in both the RF circuitry 506 and the FEM 508.

In some embodiments, the FEM circuitry 508 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 506). The transmit signal path of the FEM circuitry 508 may include a power amplifier (PA) to amplify input RF signals (e.g., provided by RF circuitry 506), and one or more filters to generate RF signals for subsequent transmission (e.g., by one or more of the one or more antennas 50).

Processors of the application circuitry 405/505 and processors of the baseband circuitry 410/50 may be used to execute elements of one or more instances of a protocol stack. For example, processors of the baseband circuitry 410/50, alone or in combination, may be used execute Layer 3, Layer 2, or Layer 1 functionality, while processors of the baseband circuitry 410/50 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 7:
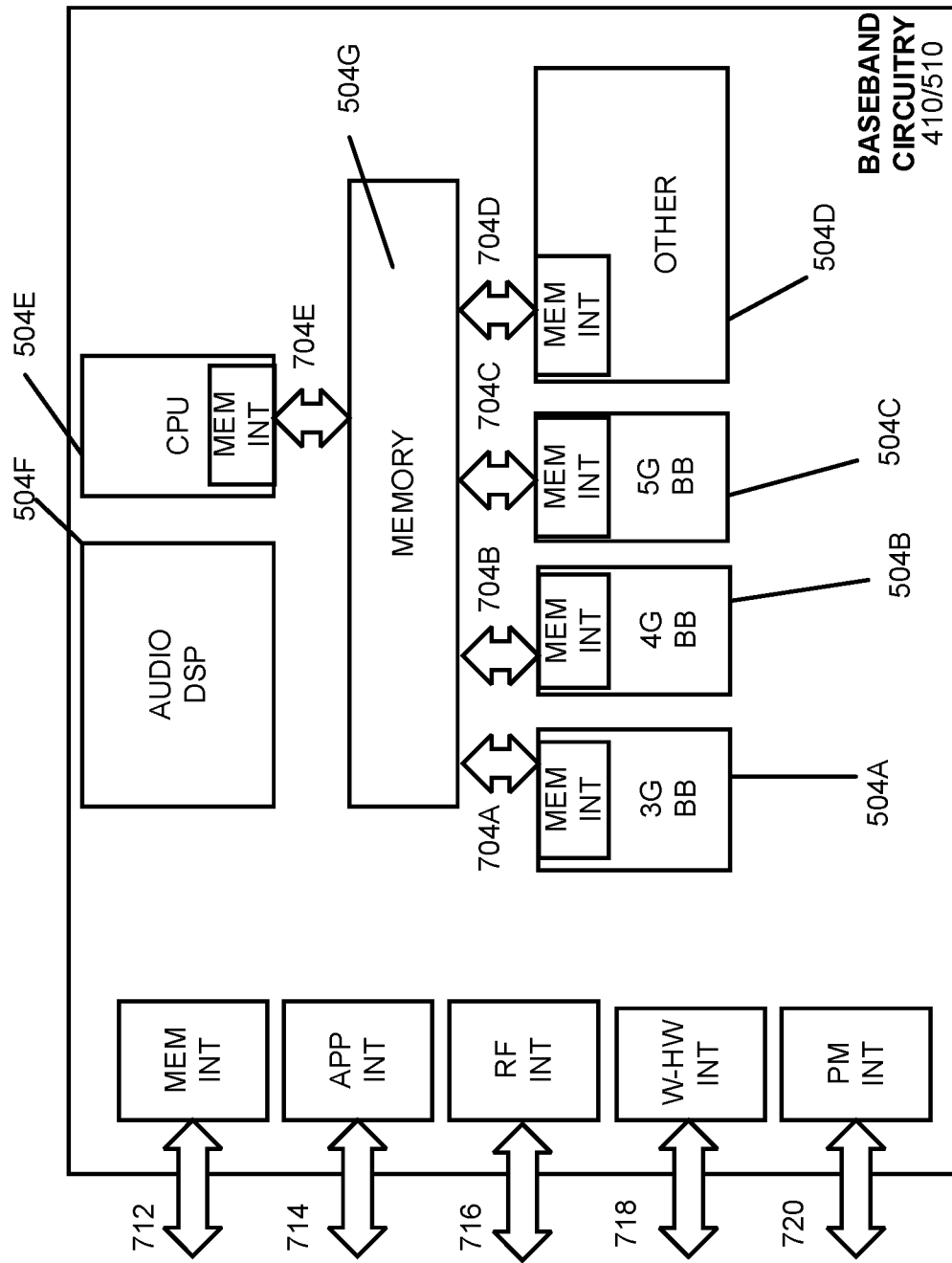
FIG. 7 illustrates example interfaces of baseband circuitry in accordance with various embodiments.

FIG. 7 illustrates example interfaces of baseband circuitry in accordance with various embodiments. As discussed above, the baseband circuitry 410/50 of FIGS. 4-5 may comprise processors 504A-504E and a memory 504G utilized by said processors. Each of the processors 504A-504E may include a memory interface, 704A-704E, respectively, to send/receive data to/from the memory 504G.

The baseband circuitry 410/50 may further include one or more interfaces to communicatively couple to other circuitries/devices, such as a memory interface 712 (e.g., an interface to send/receive data to/from memory external to the baseband circuitry 410/50), an application circuitry interface 714 (e.g., an interface to send/receive data to/from the application circuitry 405/505 of FIGS. 4-5), an RF circuitry interface 716 (e.g., an interface to send/receive data to/from RF circuitry 506 of FIG. 6), a wireless hardware connectivity interface 718 (e.g., an interface to send/receive data to/from Near Field Communication (NFC) components, Bluetooth® components (e.g., Bluetooth® Low Energy), Wi-Fi® components, and other communication components), and a power management interface 720 (e.g., an interface to send/receive power or control signals to/from the PMIC 65.

Figure 8:
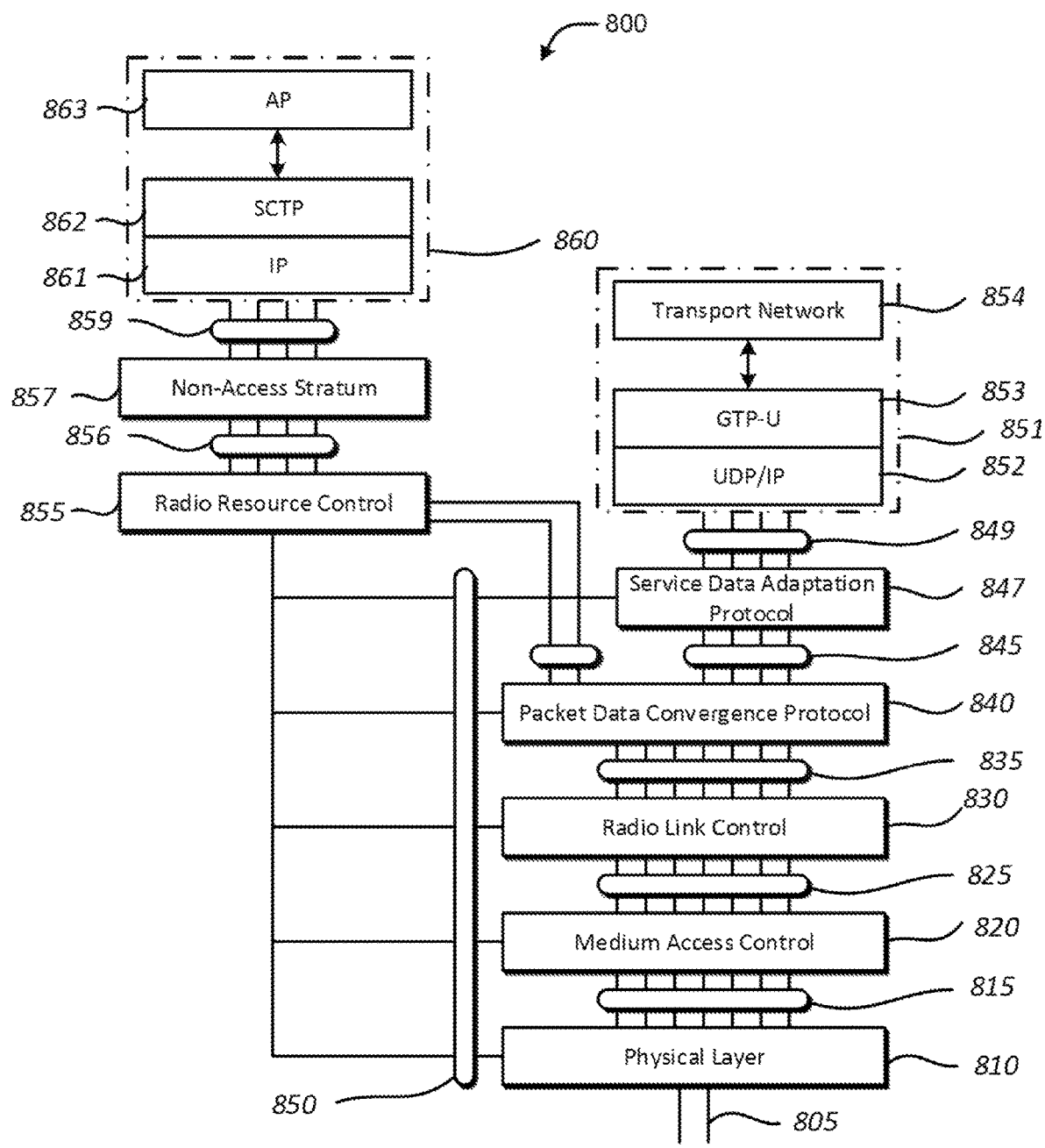
FIG. 8 illustrates various protocol functions that may be implemented in a wireless communication device according to various embodiments.

FIG. 8 illustrates various protocol functions that may be implemented in a wireless communication device according to various embodiments. In particular, FIG. 8 includes an arrangement 800 showing interconnections between various protocol layers/entities. The following description of FIG. 8 is provided for various protocol layers/entities that operate in conjunction with the Fifth Generation (5G) or New Radio (NR) system standards and LTE system standards, but some or all of the aspects of FIG. 8 may be applicable to other wireless communication network systems as well.

The protocol layers of arrangement 800 may include one or more of a physical layer (PHY) 810, a medium access control layer (MAC) 820, a radio link control layer (RLC) 830, a packet data convergence protocol layer (PDCP) 840, a service data adaptation protocol layer (SDAP) 847, a radio resource control layer (RRC) 855, and a non-access stratum (NAS) layer 857, in addition to other higher layer functions not illustrated. The protocol layers may include one or more service access points (e.g., items 859, 856, 849, 845, 835, 825, and 815 in FIG. 8) that may provide communication between two or more protocol layers.

The PHY 810 may transmit and receive physical layer signals 805 that may be received from or transmitted to one or more other communication devices. The physical layer signals 805 may comprise one or more physical channels, such as those discussed herein. The PHY 810 may further perform link adaptation or adaptive modulation and coding (AMC), power control, cell search (e.g., for initial synchronization and handover purposes), and other measurements used by higher layers, such as the RRC 855. The PHY 810 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing. In embodiments, an instance of PHY 810 may process requests from and provide indications to an instance of MAC 820 via one or more physical layer service access points (PHY-SAP) 815. According to some embodiments, requests and indications communicated via PHY-SAP 815 may comprise one or more transport channels.

Instance(s) of MAC 820 may process requests from, and provide indications to an instance of RLC 830 via one or more medium access control service access points (MAC-SAP) 825. These requests and indications communicated via the MAC-SAP 825 may comprise one or more logical channels. The MAC 820 may perform mapping between the logical channels and transport channels, multiplexing of MAC SDUs from one or more logical channels onto transport blocks (TB) to be delivered to PHY 810 via the transport channels, de-multiplexing MAC SDUs to one or more logical channels from TBs delivered from the PHY 810 via transport channels, multiplexing MAC SDUs onto TBs, scheduling information reporting, error correction through hybrid automatic repeat request (HARD), and logical channel prioritization.

Instance(s) of RLC 830 may process requests from and provide indications to an instance of PDCP 840 via one or more radio link control service access points (RLC-SAP) 835. These requests and indications communicated via RLC-SAP 835 may comprise one or more RLC channels. The RLC 830 may operate in a plurality of modes of operation, including: Transparent Mode™, Unacknowledged Mode (UM), and Acknowledged Mode (AM). The RLC 830 may execute transfer of upper layer protocol data units (PDUs), error correction through automatic repeat request (ARQ) for AM data transfers, and concatenation, segmentation and reassembly of RLC SDUs for UM and AM data transfers. The RLC 830 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 840 may process requests from and provide indications to instance(s) of RRC 855 and/or instance(s) of SDAP 847 via one or more packet data convergence protocol service access points (PDCP-SAP) 845. These requests and indications communicated via PDCP-SAP 845 may comprise one or more radio bearers. The PDCP layer 804 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 847 may process requests from and provide indications to one or more higher layer protocol entities via one or more service data adaptation protocol service access points (SDAP-SAP) 849. These requests and indications communicated via SDAP-SAP 849 may comprise one or more quality of service (QoS) flows. The SDAP 847 may map QoS flows to data radio bearers (DRBs), and vice versa, and may also mark QoS flow IDs (QFIs) in DL and UL packets. A single SDAP entity 847 may be configured for an individual PDU session. In the UL direction, the NG-RAN 120 may control the mapping of QoS Flows to DRB(s) in two different ways, reflective mapping or explicit mapping. For reflective mapping, the SDAP 847 of a UE 101 may monitor the QoS flow ID(s) of the DL packets for each DRB, and may apply the same mapping for packets flowing in the UL direction. For a DRB, the SDAP 847 of the UE 101 may map the UL packets belonging to the QoS flows(s) corresponding to the QoS flow ID(s) and PDU Session observed in the DL packets for that DRB. To enable reflective mapping, the NG-RAN 310 may mark DL packets over the Uu interface with a QoS flow ID. The explicit mapping may involve the RRC 855 configuring the SDAP 847 with an explicit QoS flow to DRB mapping rule, which may be stored and followed by the SDAP 847. In embodiments, the SDAP 847 may only be used in NR implementations and may not be used in LTE implementations.

The RRC 855 may configure, via one or more management service access points (M-SAP), aspects of one or more protocol layers, which may include one or more instances of PHY 810, MAC 820, RLC 830, PDCP 840 and SDAP 847. In embodiments, an instance of RRC 855 may process requests from and provide indications to one or more NAS entities 857 via one or more RRC service access points (RRC-SAP) 856. The main services and functions of the RRC 855 may include broadcast of system information (e.g., included in Master Information Blocks (MIBs) or System Information Blocks (SIBs) related to the NAS), broadcast of system information related to the access stratum (AS), paging, establishment, maintenance and release of an RRC connection between the UE 101 and RAN 120 (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. The MIBs and SIBs may comprise one or more information elements (IEs), which may each comprise individual data fields or data structures.

The NAS 857 may form the highest stratum of the control plane between the UE 101 and the AMF 321. The NAS 857 may support the mobility of the UEs 101 and the session management procedures to establish and maintain IP connectivity between the UE 101 and a P-GW in LTE systems.

According to various embodiments, one or more protocol entities of arrangement 800 may be implemented in UEs 101, RAN nodes 1111, AMF 321 in NR implementations or MME 221 in LTE implementations, UPF 302 in NR implementations or S-GW 222 and P-GW 223 in LTE implementations, or the like to be used for control plane or user plane communications protocol stack between the aforementioned devices. In such embodiments, one or more protocol entities that may be implemented in one or more of UE 101, gNB 111, AMF 321, etc. may communicate with a respective peer protocol entity that may be implemented in or on another device using the services of respective lower layer protocol entities to perform such communication. In some embodiments, a gNB-central unit (gNB-CU) of the gNB 111 may host the RRC 855, SDAP 847, and PDCP 840 of the gNB that controls the operation of one or more gNB-distributed units (DUs), and the gNB-DUs of the gNB 111 may each host the RLC 830, MAC 820, and PHY 810 of the gNB 111.

In a first example, a control plane protocol stack may comprise, in order from highest layer to lowest layer, NAS 857, RRC 855, PDCP 840, RLC 830, MAC 820, and PHY 810. In this example, upper layers 860 may be built on top of the NAS 857, which includes an internet protocol layer (IP) 861, an Stream Control Transmission Protocol layer (SCTP) 862, and an application layer signaling protocol (AP) 863.

In NR implementations, the AP 863 may be an NG application protocol layer (NGAP or NG-AP) 863 for the NG interface 113 defined between the NG-RAN node 111 and the AMF 321, or the AP 863 may be an Xn application protocol layer (XnAP or Xn-AP) 863 for the Xn interface 112 that is defined between two or more RAN nodes 111.

The NG-AP 863 may support the functions of the NG interface 113 and may comprise Elementary Procedures (EPs). An NG-AP EP may be a unit of interaction between the NG-RAN node 111 and the AMF 321. The NG-AP 863 services may comprise two groups: UE-associated services (e.g., services related to a UE 101, 102) and non-UE-associated services (e.g., services related to the whole NG interface instance between the NG-RAN node 111 and AMF 321). These services may include functions including, but not limited to: a paging function for the sending of paging requests to NG-RAN nodes 111 involved in a particular paging area; UE Context management function for allowing the AMF 321 to establish, modify, and/or release a UE Context in the AMF 321 and the NG-RAN node 111; mobility function for UEs 101 in ECM-CONNECTED mode for intra-system HOs to support mobility within NG-RAN and inter-system HOs to support mobility from/to EPS systems; NAS Signaling Transport function for transporting or rerouting NAS messages between UE 101 and AMF 321; a NAS node selection function for determining an association between the AMF 321 and the UE 101; NG interface management function(s) for setting up the NG interface and monitoring for errors over the NG interface; warning message transmission function provides means to transfer warning messages via NG interface or cancel ongoing broadcast of warning messages; Configuration Transfer function for requesting and transferring of RAN configuration information (e.g., Self-Organizing Network (SON) information, performance measurement (PM) data, etc.) between two RAN nodes 111 via CN 120; and/or other like functions.

The XnAP 863 may support the functions of the Xn interface 112 and may comprise XnAP basic mobility procedures and XnAP global procedures. The XnAP basic mobility procedures may comprise procedures used to handle UE mobility within the NG RAN 120 (or E-UTRAN 120), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 101, such as Xn interface setup and reset procedures, NG-RAN update procedures, cell activation procedures, and the like.

In LTE implementations, the AP 863 may be an S1 Application Protocol layer (S1-AP) 863 for the S1 interface 113 defined between an E-UTRAN node 111 and an MME, or the AP 863 may be an X2 application protocol layer (X2AP or X2-AP) 863 for the X2 interface 112 that is defined between two or more E-UTRAN nodes 111.

The S1 Application Protocol layer (S1-AP) 863 may support the functions of the S1 interface, and similar to the NG-AP discussed previously, the S1-AP may comprise S1-AP EPs. An S1-AP EP may be a unit of interaction between the E-UTRAN node 111 and an MME 221 within an LTE CN 120. The S1-AP 863 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 863 may support the functions of the X2 interface 112 and may comprise X2AP basic mobility procedures and X2AP global procedures. The X2AP basic mobility procedures may comprise procedures used to handle UE mobility within the E-UTRAN 120, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 101, such as X2 interface setup and reset procedures, load indication procedures, error indication procedures, cell activation procedures, and the like.

The SCTP layer (alternatively referred to as the SCTP/IP layer) 862 may provide guaranteed delivery of application layer messages (e.g., NGAP or XnAP messages in NR implementations, or S1-AP or X2AP messages in LTE implementations). The SCTP 863 may ensure reliable delivery of signaling messages between the RAN node 111 and the AMF 321/MME 221 based, in part, on the IP protocol, supported by the IP 861. The Internet Protocol layer (IP) 861 may be used to perform packet addressing and routing functionality. In some implementations the IP layer 861 may use point-to-point transmission to deliver convey PDUs. In this regard, the RAN node 111 may comprise L2 and L1 layer communication links (e.g., wired or wireless) with the MIME/AMY to exchange information.

In a second example, a user plane protocol stack may comprise, in order from highest layer to lowest layer, SDAP 847, PDCP 840, RLC 830, MAC 820, and PHY 810. The user plane protocol stack may be used for communication between the UE 101, the RAN node 111, and UPF 302 in NR implementations or an S-GW ZR 122 and P-GW 223 in LTE implementations. In this example, upper layers 851 may be built on top of the SDAP 847, and may include a user datagram protocol (UDP) and IP security layer (UDP/IP) 852, a General Packet Radio Service (GPRS) Tunneling Protocol for the user plane layer (GTP-U) 853, and a User Plane Protocol Data Unit layer (UP PDU) 863.

The transport network layer 854 (also referred to as a "transport layer") may be built on IP transport, and the GTP-U 851 may be used on top of the UDP/IP layer 303 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 853 may be used for carrying user data within the GPRS core network and between the radio access network and the core network. The user data transported can be packets in any of IPv4, IPv6, or PPP formats, for example. The UDP/IP 852 may provide checksums for data integrity, port numbers for addressing different functions at the source and destination, and encryption and authentication on the selected data flows. The RAN node 111 and the S-GW 222 may utilize an S1-U interface to exchange user plane data via a protocol stack comprising an L1 layer 811, an L2 layer, the UDP/IP layer 852, and the GTP-U 853. The S-GW 222 and the P-GW 223 may utilize an S5/S8a interface to exchange user plane data via a protocol stack comprising an L1 layer, an L2 layer, the UDP/IP layer 852, and the GTP-U 853. As discussed previously, NAS protocols may support the mobility of the UE 101 and the session management procedures to establish and maintain IP connectivity between the UE 101 and the P-GW 223.

Moreover, although not shown by FIG. 8, an application layer may be present above the AP 863 and/or the transport network layer 854. The application layer may be a layer in which a user of the UE 101, RAN node 111, or other network element interacts with software applications being executed, for example, by application circuitry 405 or application circuitry 505, respectively. The application layer may also provide one or more interfaces for software applications to interact with communications systems of the UE 101 or RAN node 111, such as the baseband circuitry 410/50. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

Figure 9:
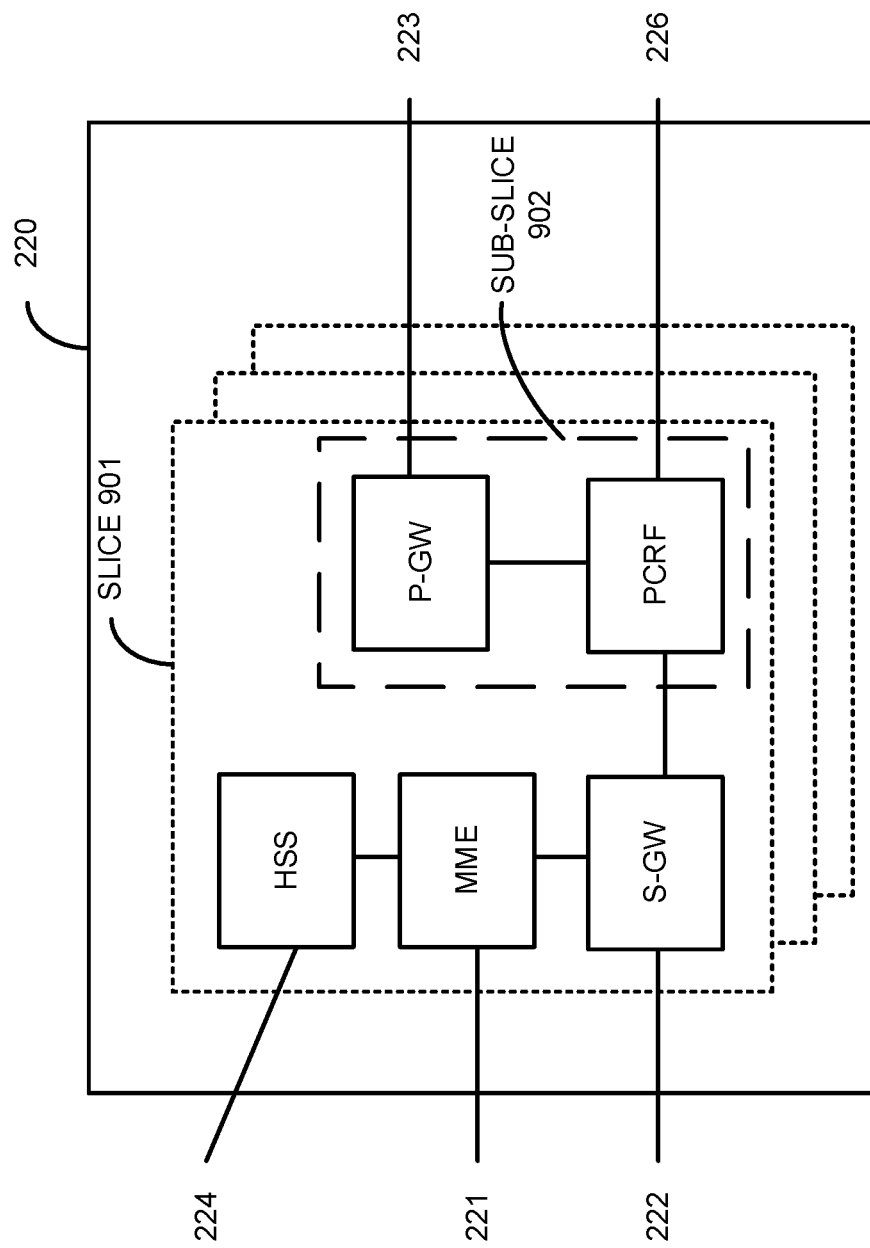
FIG. 9 illustrates components of a core network in accordance with various embodiments.

FIG. 9 illustrates components of a core network in accordance with various embodiments. The components of the CN 220 may be implemented in one physical node or separate physical nodes including components to read and execute instructions from a machine-readable or computer-readable medium (e.g., a non-transitory machine-readable storage medium). In embodiments, the components of CN 320 may be implemented in a same or similar manner as discussed herein with regard to the components of CN 220. In some embodiments, Network Functions Virtualization (NFV) is utilized to virtualize any or all of the above described network node functions via executable instructions stored in one or more computer readable storage mediums (described in further detail below). A logical instantiation of the CN 220 may be referred to as a network slice 901, and individual logical instantiations of the CN 220 may provide specific network capabilities and network characteristics. A logical instantiation of a portion of the CN 220 may be referred to as a network sub-slice 902 (e.g., the network sub-slice 902 is shown to include the PGW 223 and the PCRF 226).

As used herein, the terms "instantiate", "instantiation", and the like may refer to the creation of an instance, and an "instance" may refer to a concrete occurrence of an object, which may occur, for example, during execution of program code. A network instance may refer to information identifying a domain, which may be used for traffic detection and routing in case of different IP domains or overlapping IP addresses. A network slice instance may refer to set of network functions (NFs) instances and the resources (e.g., compute, storage, and networking resources) required to deploy the network slice.

With respect to 5G systems (see e.g., FIG. 3), a network slice may include the CN control plane and user plane NFs, NG RANs in a serving PLMN, and a N3IWF functions in the serving PLMN. Individual network slices may have different Single Network Slice Selection Assistance Information (S-NSSAI) and/or may have different Slice/Service Types (SSTs). Network slices may differ for supported features and network functions optimizations, and/or multiple network slice instances may deliver the same service/features but for different groups of UEs (e.g., enterprise users). For example, individual network slices may deliver different committed service(s) and/or may be dedicated to a particular customer or enterprise. In this example, each network slice may have different S-NSSAIs with the same SST but with different slice differentiators. Additionally, a single UE may be served with one or more network slice instances simultaneously via a 5G access node (AN) and associated with eight different S-NSSAIs. Moreover, an AMF instance serving an individual UE may belong to each of the network slice instances serving that UE.

NFV architectures and infrastructures may be used to virtualize one or more NFs, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 10:
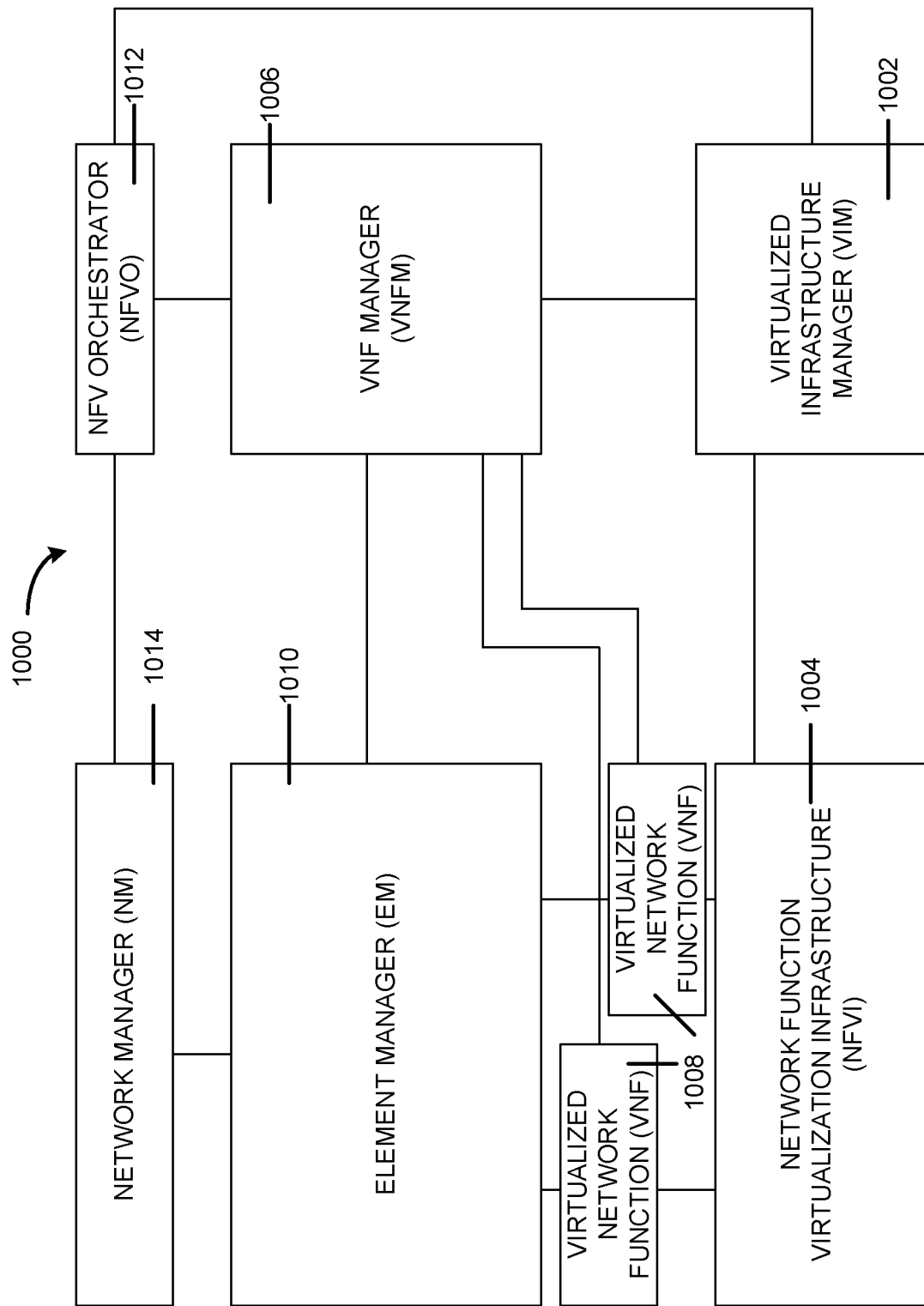
FIG. 10 is a block diagram illustrating components, according to some example embodiments, of a system to support Network Functions Virtualization (NFV).

FIG. 10 is a block diagram illustrating components, according to some example embodiments, of a system 1000 to support NFV. The system 1000 is illustrated as including a virtualized infrastructure manager (VIM) 1002, a network function virtualization infrastructure (NFVI) 1004, a VNF manager (VNFM) 1006, virtualized network functions (VNFs) 1008, an element manager (EM) 1010, an NFV Orchestrator (NFVO) 1012, and a network manager (NM) 1014.

The VIM 1002 manages the resources of the NFVI 1004. The NFVI 1004 can include physical or virtual resources and applications (including hypervisors) used to execute the system 1000. The VIM 1002 may manage the life cycle of virtual resources with the NFVI 1004 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1006 may manage the VNFs 1008. The VNFs 1008 may be used to execute EPC components/functions. The VNFM 1006 may manage the life cycle of the VNFs 1008 and track performance, fault and security of the virtual aspects of VNFs 1008. The EM 1010 may track the performance, fault and security of the functional aspects of VNFs 1008. The tracking data from the VNFM 1006 and the EM 1010 may comprise, for example, performance measurement (PM) data used by the VIM 1002 or the NFVI 1004. Both the VNFM 1006 and the EM 1010 can scale up/down the quantity of VNFs of the system 1000.

The NFVO 1012 may coordinate, authorize, release and engage resources of the NFVI 1004 in order to provide the requested service (e.g., to execute an EPC function, component, or slice). The NM 1014 may provide a package of end-user functions with the responsibility for the management of a network, which may include network elements with VNFs, non-virtualized network functions, or both (management of the VNFs may occur via the EM 1010).

Figure 11:
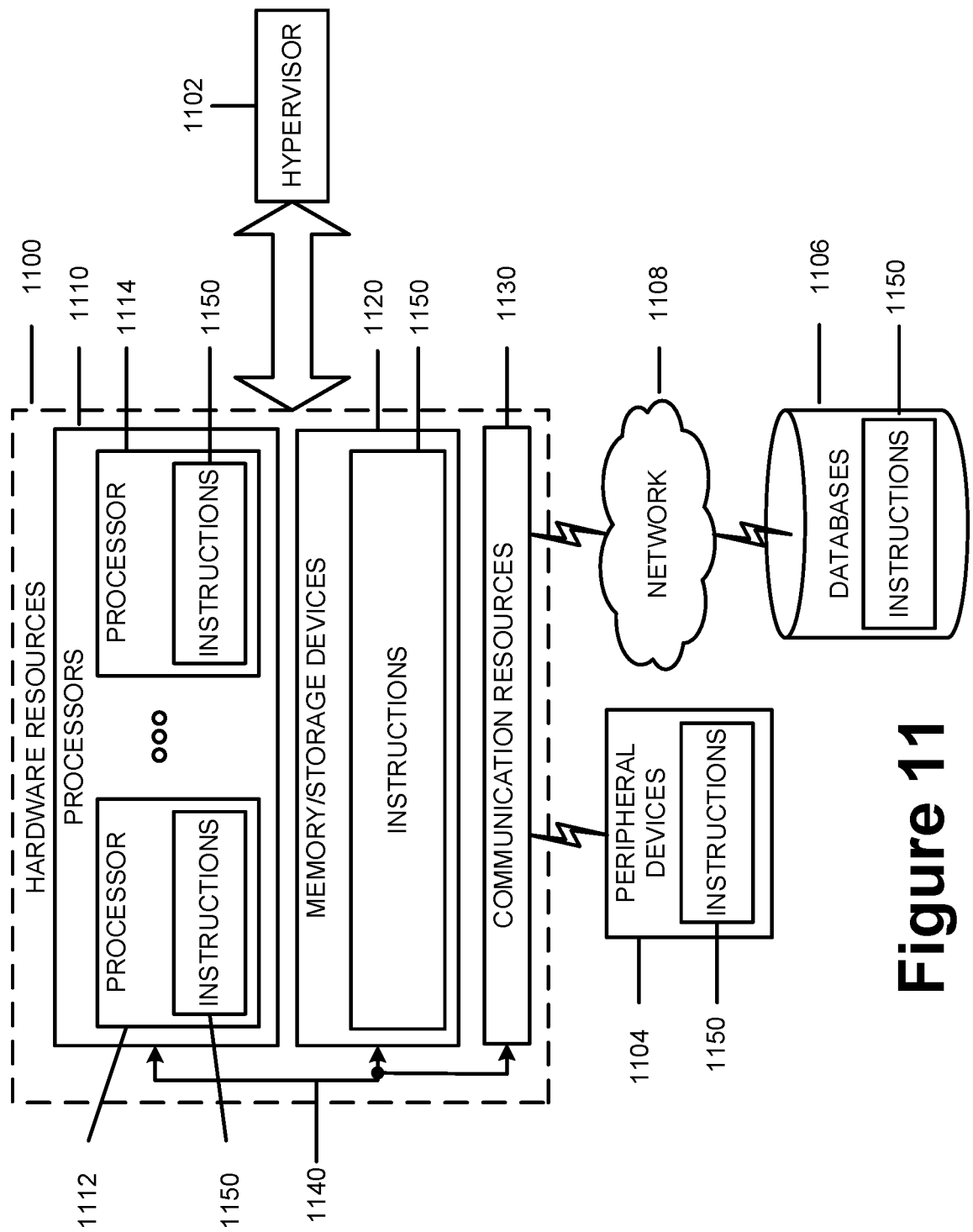
FIG. 11 is a block diagram illustrating components, according to some example embodiments, able to read instructions from a machine-readable or computer-readable medium (e.g., a non-transitory machine-readable storage medium) and perform any one or more of the methodologies discussed herein.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 1102 may be executed to provide an execution environment for one or more network slices/sub-slices to utilize the hardware resources 1100. A "virtualized resource" may refer to compute, storage, and/or network resources provided by virtualization infrastructure to an application, device, system, etc.

The processors 1110 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1112 and a processor 1114.

The memory/storage devices 1120 may include main memory, disk storage, or any suitable combination thereof. The memory/storage devices 1120 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

In some embodiments, one or more devices and/or components of FIGS. 1, 2, 4, 5, 6, 7, 8, 9, 11, and/or some other Figure herein, and particularly the baseband circuitry of FIG. 7, may be to: construct an SIB1-NB signal for transmission; and transmit the SIB1-NB signal on a non-anchor carrier for TDD NB-IoT.

In some embodiments, one or more devices and/or components of FIGS. 1, 2, 4, 5, 6, 7, 8, 9, 11, and/or some other Figure herein, and particularly the baseband circuitry of FIG. 7, may be to: receive an SIB1-NB signal on a non-anchor carrier for TDD NB-IoT; and construct a signal for transmission based at least in part on the SIB1-NB signal.

Figure 12:
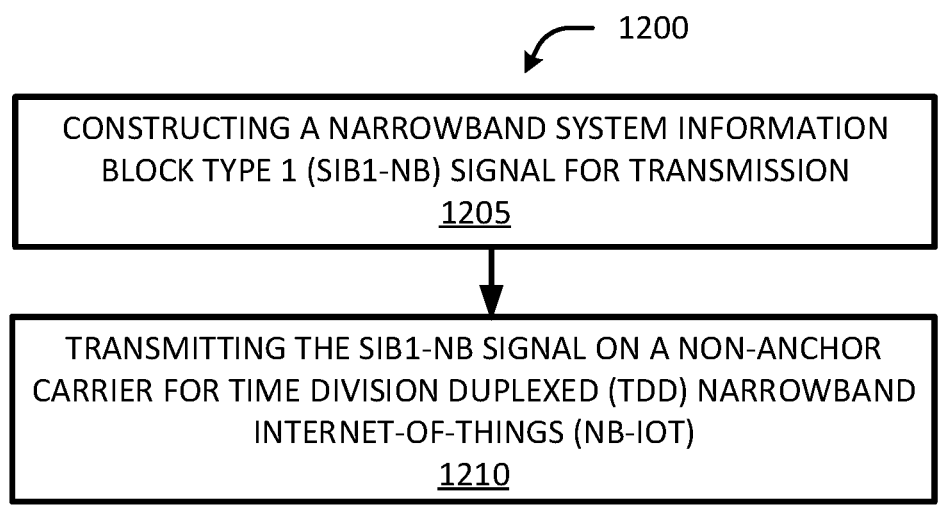
FIG. 12 is a flow chart illustrating a method of constructing and transmitting a narrowband system information block type 1 (SIB1-NB) signal, according to one embodiment.

In some embodiments, the electronic device(s), network(s), system(s), chip(s) or component(s), or portions or implementations thereof, of FIGS. 1, 2, 4, 5, 6, 7, 8, 9, 11, or some other figure herein may be configured to perform one or more processes, techniques, or methods as described herein, or portions thereof. One such process is depicted in FIG. 12. For example, the process may include constructing or causing to construct an SIB1-NB signal for transmission; and transmitting or causing to transmit the SIB1-NB signal on a non-anchor carrier for TDD NB-IoT.

Figure 13:
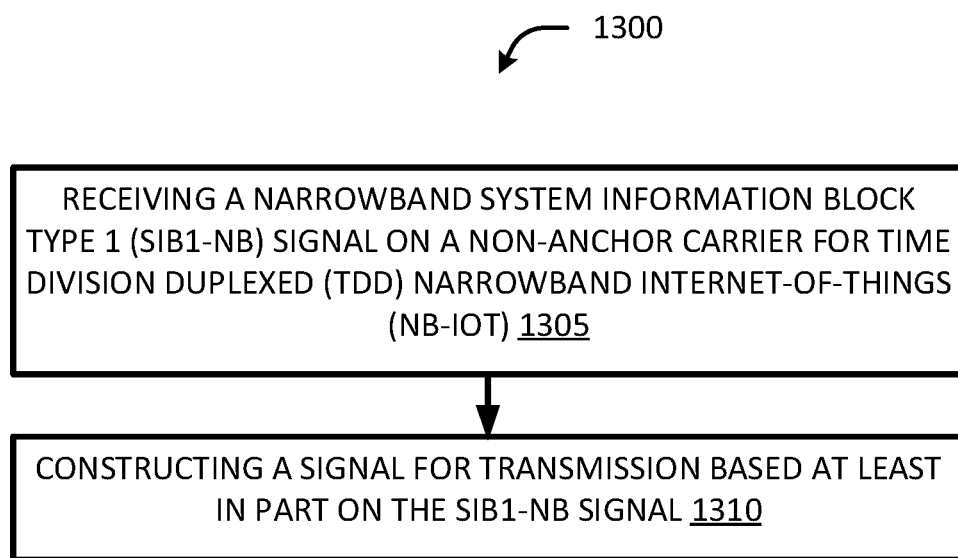
FIG. 13 is a flow chart illustrating a method of receiving an SIB1-NB signal and constructing a signal based, at least in part, on the received SIB1-NB signal, according to one embodiment.

In some embodiments, the electronic device(s), network(s), system(s), chip(s) or component(s), or portions or implementations thereof, of FIGS. 1, 2, 4, 5, 6, 7, 8, 9, 11, or some other figure herein may be configured to perform one or more processes, techniques, or methods as described herein, or portions thereof. One such process is depicted in FIG. 13. For example, the process may include receiving or causing to receive an SIB1-NB signal on a non-anchor carrier for TDD feNB-IoT; and constructing or causing to construct a signal for transmission based at least in part on the SIB1-NB signal.

FIG. 12 is a flowchart illustration of a method 1200 of constructing an SIB1-NB signal that is transmitted on a non-anchor carrier, according to an embodiment. The method 1200 may be performed by an apparatus (e.g., baseband circuitry, etc.) that is part of a base station (e.g., any one of the base stations (e.g., NodeB, eNodeB, any other type of base station) described above in connection with one or more of FIGS. 1-11). The method 1200 begins at operation 1205. Here, an SIB1-N1 is constructed according to the description provided in connection with FIG. 1. Next, the method 1200 proceeds to operation 1210, where, the constructed SIB1-NB is transmitted on a non-anchor carrier for TDD NB-IoT.

FIG. 13 is a flowchart illustration of a method 1300 of constructing a signal based on an SIB1-NB signal, according to an embodiment. The method 1300 may be performed by an apparatus (e.g., baseband circuitry, etc.) that is part of a UE (e.g., any one of the UEs described above in connection with one or more of FIGS. 1-11). The method 1300 begins at operation 1305. Here, an SIB1-N1 is received on a non-anchor carrier according to the description provided in connection with FIG. 1. Next, the method 1300 proceeds to operation 1310 where, the SIB1-NB is used to construct a signal for transmission. The constructed signal may be transmitted, for example, to a UE, a base station, etc.

Figure 14:
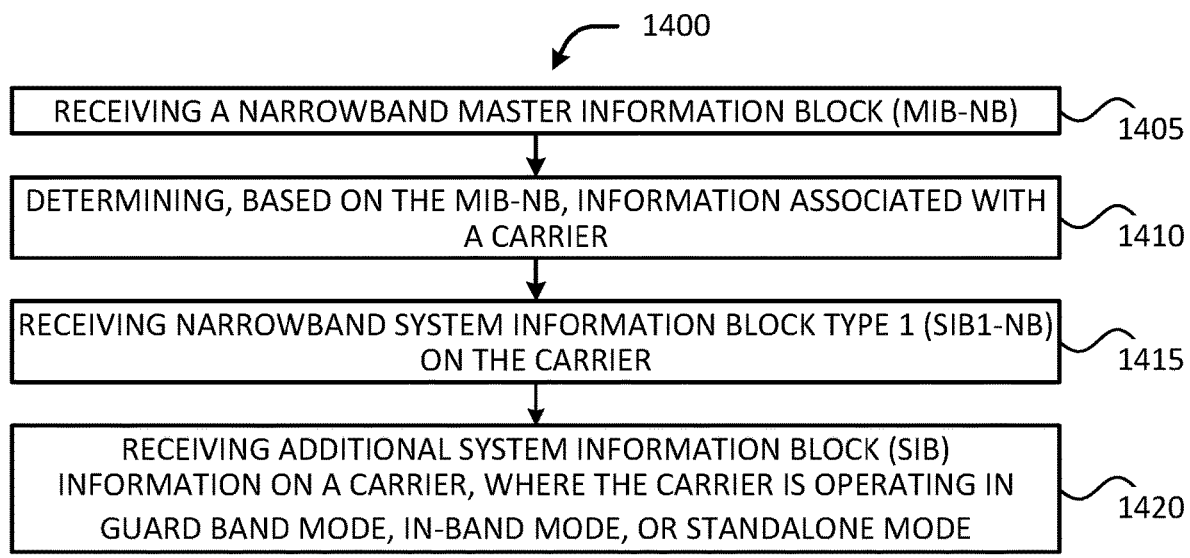
FIG. 14 is a flow chart illustrating a method of receiving an SIB1-NB signal on a carrier, according to one embodiment.

With regard now to FIG. 14, a flowchart illustration of a method 1400 of receiving an SIB1-NB signal on a carrier (e.g., an anchor carrier, a non-anchor carrier, etc.) is shown, according to one embodiment. The method 1400 may be performed by an apparatus (e.g., baseband circuitry, etc.) that is part of a UE (e.g., any one of the UEs described above in connection with one or more of FIGS. 1-11). The method 1400 begins at operation 1405, where MIB-NB information is received. Next, at operation 1410, the received MIB-NB information is analyzed or processed to determine information associated with a carrier (e.g., a non-anchor carrier, an anchor carrier, etc.) that is to be used at a subsequent time. The MIB-NB includes 11 additional bits that indicate information about the carrier. In one embodiment, at least one of the 11 additional bits indicates whether the carrier is operating in in-band mode, guard band mode, or standalone mode. Additional information about how the MIB-NB information is used to indicate information associated with a carrier is described above in connection with FIG. 1. Following the determination, at operation 1415, an SIB1-NB is transported on the carrier and received by the apparatus. Next, at operation 1420, additional SIB information is transported on a carrier (e.g., the carrier used to transport the SIB-NB, another carrier, etc.) and received by the apparatus. In one embodiment, the carrier described above with regard to operation 1420 is operating in guard band mode, in-band mode, or standalone mode. Additional information about carriers operating in different modes is described above in connection with FIG. 1.

Figure 15:
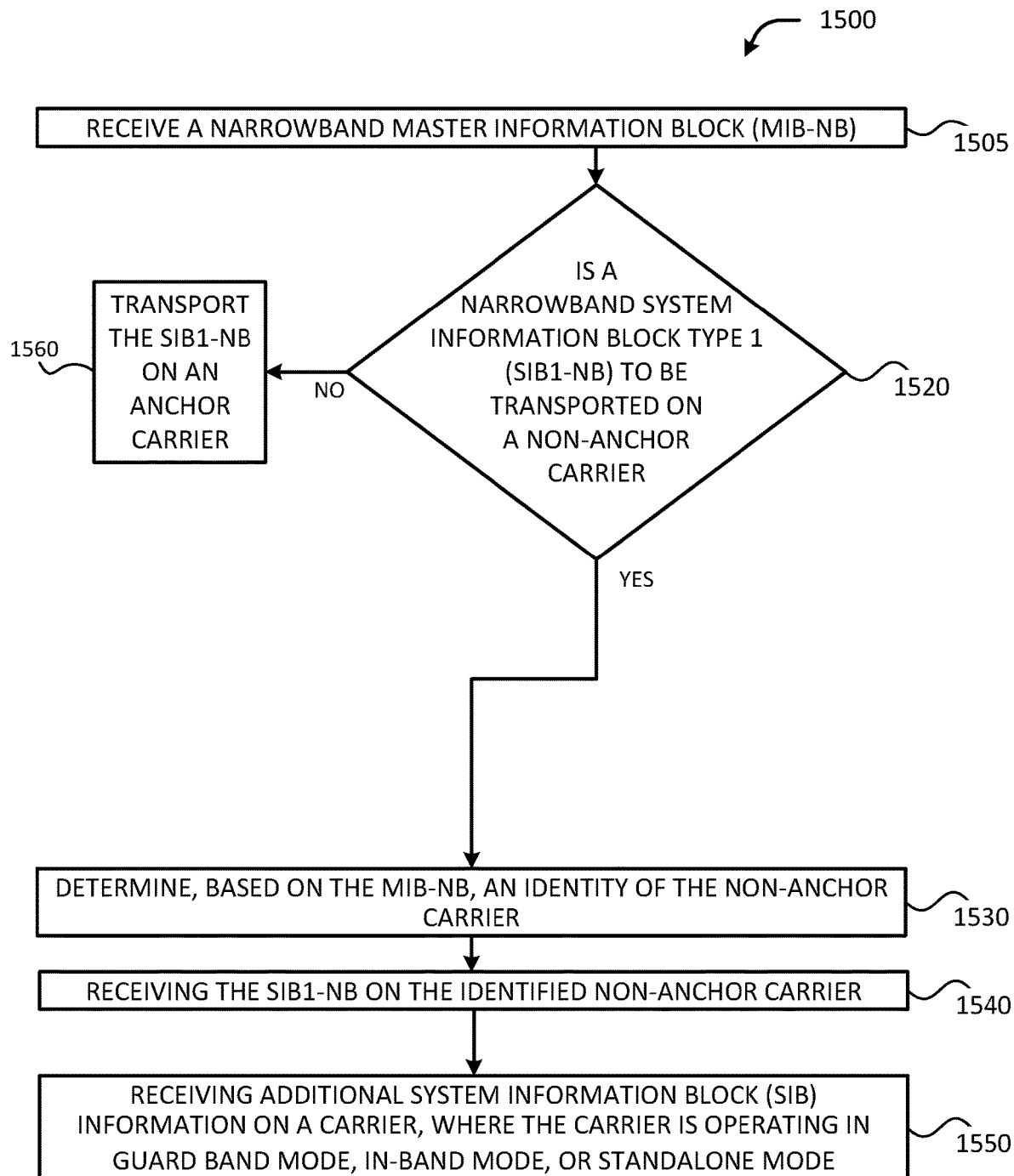
FIG. 15 is a flow chart illustrating a method of receiving an SIB1-NB signal on a carrier, according to another embodiment.

Moving on FIG. 15, a flowchart illustration of a method 1500 of receiving an SIB1-NB signal on a carrier (e.g., an anchor carrier, a non-anchor carrier, etc.) is shown, according to another embodiment. The method 1500 may be performed by an apparatus (e.g., baseband circuitry, etc.) that is part of a UE (e.g., any one of the UEs described above in connection with one or more of FIGS. 1-13). As shown, the method 1500 begins at operation 1505, where an MIB-NB is received. In one embodiment, at operation 1520, at least one of the 11 additional bits of the MIB-NB is used to determine whether an SIB1-NB is to be transported on an anchor carrier or a non-anchor carrier, as described above in connection with FIG. 1. If the SIB1-NB is not to be received on a non-anchor carrier, the method 1500 proceeds to operation 1560. Here, the SIB1-NB is received on an anchor carrier. On the other hand, if the SIB1-NB is to be transported on a non-anchor carrier, the method 1500 proceeds to operation 1530. Here, an identity of the non-anchor carrier is determined, as described above in connection with FIG. 1. Next, at operation 1540, the SIB1-NB is received on the identified non-anchor carrier. Additionally, at operation 1550, additional SIB information is received on a carrier (e.g., the non-anchor carrier, another non-anchor carrier, the anchor carrier, another anchor carrier, etc.), as described above in connection with FIG. 1.

Figure 16:
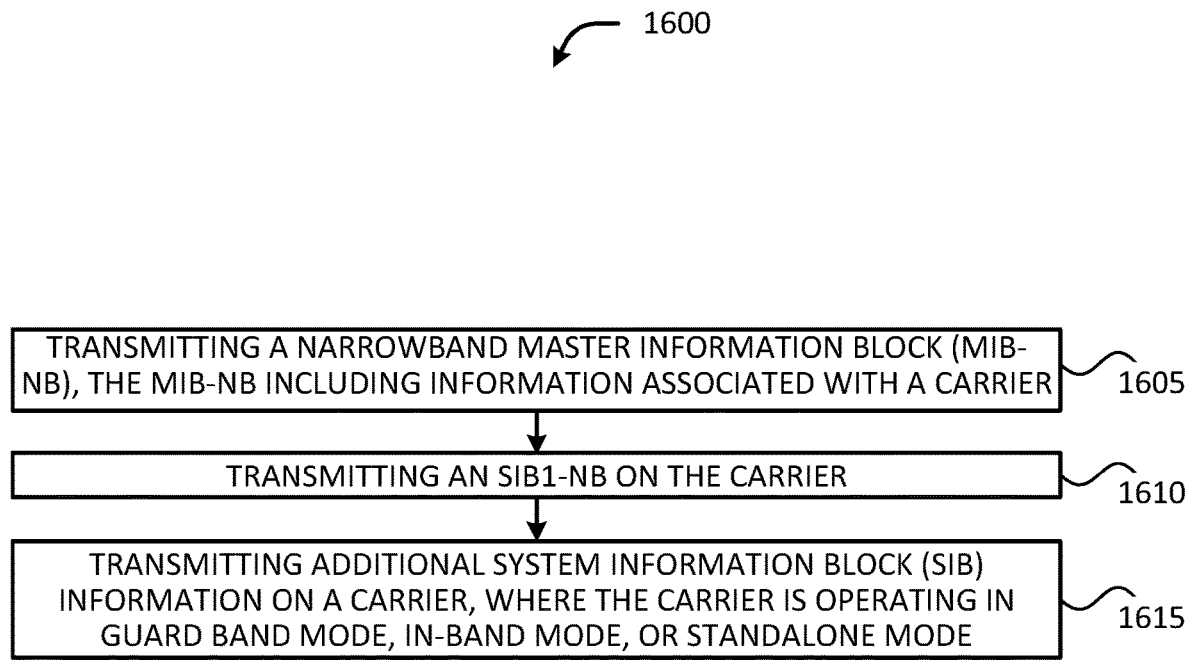
FIG. 16 is a flow chart illustrating a method of transmitting an SIB1-NB signal on a carrier, according to another embodiment.

Referring now to FIG. 16, a flowchart illustration of a method of transmitting an SIB1-NB signal on a carrier (e.g., an anchor carrier, a non-anchor carrier, etc.) is shown. The method 1600 may be performed by an apparatus (e.g., circuitry, etc.) that is part of a base station (e.g., any one of the base stations (e.g., NodeB, eNodeB, gNodeB, any other type of base station) described above in connection with one or more of FIGS. 1-13). The method 1600 begins at operation 1605. Here, MIB-NB information associated with a carrier (e.g., an anchor carrier, a non-anchor carrier, etc.) is transmitted, as described above in connection with FIG. 1. Next, at operation 1610, SIB1-NB is transmitted or transported on the carrier (e.g., an anchor carrier, a non-anchor carrier, etc.), as described above in connection with FIG. 1. Subsequently, the method 1600 proceeds on to operation 1615. Here, additional SIB information is transmitted or transported on a carrier (e.g., the carrier used to transport the SIB1-NB, another carrier, etc.), as described above in connection with FIG. 1.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

The examples set forth herein are illustrative not exhaustive.

Example 1 may include an apparatus comprising: means for constructing a narrowband system information block type 1 (SIB1-NB) signal for transmission; and means for transmitting the SIB1-NB signal on a non-anchor carrier for time division duplexed (TDD) narrowband internet-of-things (NB-IoT).

Example 2 may include the subject matter of Example 1 and/or some other examples herein, wherein the SIB1-NB transmission on the non-anchor carrier is supported in all multi-carrier operations supported in TDD NB-IoT.

Example 3 may include the subject matter of Example 1 and/or some other examples herein, wherein the SIB1-NB transmission on the non-anchor carrier is supported in one or more of:

a multi-carrier operation supported in TDD NB-IoT where the anchor carrier is an in-band carrier and the non-anchor carrier is an in-band carrier, a multi-carrier operation supported in TDD NB-IoT where the anchor carrier is a standalone carrier and the non-anchor carrier is a standalone carrier, a multi-carrier operation supported in TDD NB-IoT where the anchor carrier is a guard band carrier and the non-anchor carrier is an in-band carrier or a multi-carrier operation supported in TDD NB-IoT where the anchor carrier is a guard band carrier and the non-anchor carrier is a guard band.

Example 4 may include the subject matter of Example 3 and/or some other examples herein, wherein the SIB1-NB transmission on the non-anchor carrier is supported for one or more guard band anchor/in-band non-anchor carrier operations.

Example 5 may include the subject matter of Example 1 and/or some other examples herein, wherein one bit in a narrowband master information block (MIB-NB) is used to indicate whether the SIB1-NB transmission is transmitted on an anchor carrier or the non-anchor carrier.

Example 6 may include the subject matter of Example 1 and/or some other examples herein, wherein for in-band/in-band and standalone/standalone scenarios, N bits are used in an MIB-NB to indicate the offset of the non-anchor carrier with SIB1-NB from the anchor carrier, where N is an integer.

Example 7 may include the subject matter of Example 6 and/or some other examples herein, wherein N is equal to 1 to indicate one out of the two neighboring carriers of the anchor carrier.

Example 8 may include the subject matter of Example 1 and/or some other examples herein, wherein for in-band/guard band scenarios, a plurality of in-band and guard band carriers are predefined, and N bits in an MIB-NB are used to indicate one of the predefined carriers, where N is an integer.

Example 9 may include the subject matter of Example 1 and/or some other examples herein, wherein for in-band/guard band or guard band/guard band scenarios, 2 bits are used in an MIB-NB to indicate the system bandwidth (BW) from candidate set {5, 10, 15, 20} megahertz (MHz).

Example 10 may include the subject matter of Example 1 and/or some other examples herein, wherein for guard band/guard band scenarios, the non-anchor carrier is always a symmetric guard band carrier on the other side of system BW, with respect to anchor carrier, and N bits are used to indicate which guard band carrier is used for the anchor carrier, where N is an integer.

Example 11 may include the subject matter of Example 10 and/or some other examples herein, wherein values of N equal to 0, 1, 2, and 3 bits respectively, correspond to a system bandwidth (BW) of 5, 10, 15 and 20 MHz, respectively.

Example 12 may include the subject matter of Example 1 and/or some other examples herein, wherein for in-band anchor scenarios, reserved bits in an MIB-NB are used for indication of the SIB1-NB signal.

Example 13 may include the subject matter of Example 1 and/or some other examples herein, wherein for guard band anchor scenarios, one or more of 3 spare bits in a 5-bit field for a raster offset indication or one or more reserved bits in an MIB-NB are used for indication of the SIB1-NB signal.

Example 14 may include the subject matter of Example 1 and/or some other examples herein, wherein for standalone/standalone scenarios, one or more of 5 spare bits in a 5-bit field for raster offset indication are used for indication of the SIB1-NB signal.

Example 15 may include the subject matter of any one of Examples 1-14 and/or some other examples herein, wherein the apparatus is an evolved NodeB (eNB), a next generation NodeB (gNB), or a portion or implementation thereof.

Example 16 may include an apparatus comprising: means for receiving a narrowband system information block type 1 (SIB1-NB) signal on a non-anchor carrier for time division duplexed (TDD) narrowband internet-of-things (NB-IoT); and means for constructing a signal for transmission based at least in part on the SIB1-NB signal.

Example 17 may include the subject matter of Example 16 and/or some other examples herein, wherein the SIB1-NB signal on the non-anchor carrier is supported in all multi-carrier operations supported in TDD NB-IoT.

Example 18 may include the subject matter of Example 16 and/or some other examples herein, wherein the SIB1-NB signal on the non-anchor carrier is supported in one or more of in-band/in-band, standalone/standalone, guard band/in-band, or guard band/guard band multi-carrier operations supported in TDD NB-IoT.

Example 19 may include the subject matter of Example 18 and/or some other examples herein, wherein the SIB1-NB signal on the non-anchor carrier is supported for one or more guard band anchor/in-band non-anchor carrier operations.

Example 20 may include the subject matter of Example 16 and/or some other examples herein, wherein one bit in a narrowband master information block (MIB-NB) is used to indicate whether the SIB1-NB signal is transmitted on an anchor carrier or the non-anchor carrier.

Example 21 may include the subject matter of Example 16 and/or some other examples herein, wherein for in-band/in-band and standalone/standalone scenarios, N bits are used in an MIB-NB to indicate the offset of the non-anchor carrier with SIB1-NB from the anchor carrier, where N is an integer.

Example 22 may include the subject matter of Example 21 and/or some other examples herein, wherein N is equal to 1 to indicate one out of the two neighboring carriers of the anchor carrier.

Example 23 may include the subject matter of Example 16 and/or some other examples herein, wherein for in-band/guard band scenarios, a plurality of in-band and guard band carriers are predefined, and N bits in an MIB-NB are used to indicate one of the predefined carriers, where N is an integer.

Example 24 may include the subject matter of Example 16 and/or some other examples herein, wherein for in-band/guard band or guard band/guard band scenarios, 2 bits are used in an MIB-NB to indicate the system bandwidth (BW) from candidate set {5, 10, 15, 20} megahertz (MHz).

Example 25 may include the subject matter of Example 16 and/or some other examples herein, wherein for guard band/guard band scenarios, the non-anchor carrier is a symmetric guard band carrier on the other side of system BW, with respect to anchor carrier, and N bits are used to indicate which guard band carrier is used for the anchor carrier, where N is an integer.

Example 26 may include the subject matter of Example 25 and/or some other examples herein, wherein values of N equal to 0, 1, 2, and 3 bits respectively, correspond to a system bandwidth (BW) of 5, 10, 15 and 20 MHz, respectively.

Example 27 may include the subject matter of Example 16 and/or some other examples herein, wherein for in-band anchor scenarios, reserved bits in an MIB-NB are used for indication of the SIB1-NB signal.

Example 28 may include the subject matter of Example 16 and/or some other examples herein, wherein for guard band anchor scenarios, one or more of 3 spare bits in a 5-bit field for a raster offset indication or one or more reserved bits in an MIB-NB are used for indication of the SIB1-NB signal.

Example 29 may include the subject matter of Example 16 and/or some other examples herein, wherein for standalone/standalone scenarios, one or more of 5 spare bits in a 5-bit field for raster offset indication are used for indication of the SIB1-NB signal.

Example 30 may include the subject matter of any one of Examples 16-29 and/or some other examples herein, wherein the apparatus is a user equipment (UE) or a portion or implementation thereof.

Example 31 may include a method of narrowband system information block type 1 (SIB1-NB) transmission on a non-anchor carrier for time division duplexed (TDD) narrowband internet-of-things (NB-IoT).

Example 32 may include the method of example 31 and/or some other examples herein, wherein SIB1-NB transmission on a non-anchor carrier is supported in all multi-carrier operations supported in TDD NB-IoT.

Example 33 may include the method of example 31 and/or some other examples herein, wherein SIB1-NB transmission on a non-anchor carrier is supported in some multi-carrier operations supported in TDD NB-IoT, e.g. in-band/in-band, standalone/standalone, guard band/in-band, and guard band/guard band.

Example 34 may include the method of example 33 and/or some other examples herein, wherein SIB1-NB transmission on a non-anchor carrier is also supported in guard band anchor/in-band non-anchor carrier scenarios.

Example 35 may include the method of example 31 and/or some other examples herein, wherein 1 bit in a narrowband master information block (MIB-NB) can be used to indicate whether the SIB1-NB is transmitted on anchor or non-anchor carrier.

Example 36 may include the method of example 31 and/or some other examples herein, wherein for in-band/in-band and standalone/standalone scenarios, N bits can be used in an MIB-NB to indicate the offset of the non-anchor carrier with SIB1-NB from the anchor carrier, e.g. N is equal to 1 to indicate one out of the two neighboring carriers of the anchor carrier.

Example 37 may include the method of example 31 and/or some other examples herein, wherein for in-band/guard band scenario, several pairs of in-band and guard band carriers can be predefined, and N bits in an MIB-NB can be used to indicate one out these candidate pairs.

Example 38 may include the method of example 31 and/or some other examples herein, wherein for in-band/guard band or guard band/guard band scenarios, 2 bits can be used in an MIB-NB to indicate the system bandwidth (BW) from candidate set {5, 10, 15, 20} MHz.

Example 39 may include the method of example 31 and/or some other examples herein, wherein for guard band/guard band scenario, the non-anchor carrier can be the symmetric guard band carrier on the other side of system BW, with respect to an anchor carrier, and N bits can be used to indicate which guard band carrier is used for the anchor carrier, e.g. 0, 1, 2, and 3 bits can be used for system BW of 5, 10, 15 and 20 MHz.

Example 40 may include the method of example 31 and/or some other examples herein, wherein for a guard band/guard band scenario, N bits can be used to indicate which guard band carrier is used as a non-anchor carrier for SIB1-NB transmission, e.g. N=1, 2, 3 and 4 for system BW of 5, 10, 15, and 20 MHz respectively.

Example 41 may include the method of example 31 and/or some other examples herein, wherein for an in-band anchor scenario, additional bits needed for the indication are selected from reserved bits in MIB-NB.

Example 42 may include the method of example 31 and/or some other examples herein, wherein for guard band anchor scenarios, additional bits needed for the indication can be selected from 3 spare bits in the 5-bit field for raster offset indication and/or from reserved bits in MIB-NB.

Example 43.0 may include the method of example 31 and/or some other examples herein, wherein for standalone/standalone scenarios, additional bits needed for the indication can be selected from 5 spare bits in the 5-bit field for raster offset indication in in-band/guard band anchor carrier scenarios and/or reserved bits in MIB-NB.

Example 43.1 may include the method of example 31 and/or some other examples herein, wherein for the guard band anchor carrier case, 1 bit out of the 3 spare bits in the 5-bit field for indication of raster offset can be used to indicate number of CRS ports for differentPCI case and to indicate system BW for samePCI case, and/or another 1 bit out of this field can be used to indicate whether it is samePCI or differentPCI case.

Example 44 may include an apparatus to: construct a narrowband system information block type 1 (SIB1-NB) signal for transmission; and transmit the SIB1-NB signal on a non-anchor carrier for time division duplexed (TDD) narrowband internet-of-things (NB-IoT).

Example 45 may include the subject matter of Example 44 and/or some other examples herein, wherein the SIB1-NB transmission on the non-anchor carrier is supported in all multi-carrier operations supported in TDD NB-IoT.

Example 46 may include the subject matter of Example 44 and/or some other examples herein, wherein the SIB1-NB transmission on the non-anchor carrier is supported in one or more of in-band/in-band, standalone/standalone, guard band/in-band, or guard band/guard band multi-carrier operations supported in TDD NB-IoT.

Example 47 may include the subject matter of Example 46 and/or some other examples herein, wherein the SIB1-NB transmission on the non-anchor carrier is supported for one or more guard band anchor/in-band non-anchor carrier operations.

Example 48 may include the subject matter of Example 44 and/or some other examples herein, wherein one bit in a narrowband master information block (MIB-NB) is used to indicate whether the SIB1-NB transmission is transmitted on an anchor carrier or the non-anchor carrier.

Example 49 may include the subject matter of Example 44 and/or some other examples herein, wherein for in-band/in-band and standalone/standalone scenarios, N bits are used in an MIB-NB to indicate an offset of the non-anchor carrier with SIB1-NB from the anchor carrier, where N is an integer.

Example 50 may include the subject matter of Example 49 and/or some other examples herein, wherein N is equal to 1 to indicate one out of the two neighboring carriers of the anchor carrier.

Example 51 may include the subject matter of Example 44 and/or some other examples herein, wherein for in-band/guard band scenarios, a plurality of in-band and guard band carriers are predefined, and N bits in an MIB-NB are used to indicate one of the predefined carriers, where N is an integer.

Example 52 may include the subject matter of Example 44 and/or some other examples herein, wherein for in-band/guard band or guard band/guard band scenarios, 2 bits are used in an MIB-NB to indicate the system bandwidth (BW) from candidate set {5, 10, 15, 20} megahertz (MHz).

Example 53 may include the subject matter of Example 44 and/or some other examples herein, wherein for guard band/guard band scenarios, the non-anchor carrier is a symmetric guard band carrier on the other side of system BW, with respect to an anchor carrier, and N bits are used to indicate which guard band carrier is used for the anchor carrier, where N is an integer.

Example 54 may include the subject matter of Example 53 and/or some other examples herein, wherein values of N equal to 0, 1, 2, and 3 bits respectively, correspond to a system bandwidth (BW) of 5, 10, 15 and 20 MHz, respectively.

Example 55 may include the subject matter of Example 44 and/or some other examples herein, wherein for in-band anchor scenarios, reserved bits in an MIB-NB are used for indication of the SIB1-NB signal.

Example 56 may include the subject matter of Example 44 and/or some other examples herein, wherein for guard band anchor scenarios, one or more of 3 spare bits in a 5-bit field for a raster offset indication or one or more reserved bits in MIB-NB are used for indication of the SIB1-NB signal.

Example 57 may include the subject matter of Example 44 and/or some other examples herein, wherein for standalone/standalone scenarios, one or more of 5 spare bits in a 5-bit field for raster offset indication are used for indication of the SIB1-NB signal.

Example 58 may include the subject matter of any one of Examples 44-57 and/or some other examples herein, wherein the apparatus is an evolved NodeB (eNB), a next generation NodeB (gNB), or a portion or implementation thereof.

Example 59 may include an apparatus to: receive a narrowband system information block type 1 (SIB1-NB) signal on a non-anchor carrier for time division duplexed (TDD) narrowband internet-of-things (NB-IoT); and construct a signal for transmission based at least in part on the SIB1-NB signal.

Example 60 may include the subject matter of Example 59 and/or some other examples herein, wherein the SIB1-NB signal on the non-anchor carrier is supported in all multi-carrier operations supported in TDD NB-IoT.

Example 61 may include the subject matter of Example 59 and/or some other examples herein, wherein the SIB1-NB signal on the non-anchor carrier is supported in one or more of in-band/in-band, standalone/standalone, guard band/in-band or guard band/guard band multi-carrier operations supported in TDD NB-IoT.

Example 62 may include the subject matter of Example 61 and/or some other examples herein, wherein the SIB1-NB signal on the non-anchor carrier is supported for one or more guard band anchor/in-band non-anchor carrier operations.

Example 63 may include the subject matter of Example 59 and/or some other examples herein, wherein one bit in a narrowband master information block (MIB-NB) is used to indicate whether the SIB1-NB signal is transmitted on an anchor carrier or the non-anchor carrier.

Example 64 may include the subject matter of Example 59 and/or some other examples herein, wherein for in-band/in-band and standalone/standalone scenarios, N bits are used in an MIB-NB to indicate the offset of the non-anchor carrier with SIB1-NB from the anchor carrier, where N is an integer.

Example 65 may include the subject matter of Example 64 and/or some other examples herein, wherein N is equal to 1 to indicate one out of the two neighboring carriers of the anchor carrier.

Example 66 may include the subject matter of Example 59 and/or some other examples herein, wherein for in-band/guard band scenarios, a plurality of in-band and guard band carriers are predefined, and N bits in an MIB-NB are used to indicate one of the predefined carriers, where N is an integer.

Example 67 may include the subject matter of Example 59 and/or some other examples herein, wherein for in-band/guard band or guard band/guard band scenarios, 2 bits are used in an MIB-NB to indicate the system bandwidth (BW) from candidate set {5, 10, 15, 20} megahertz (MHz).

Example 68 may include the subject matter of Example 59 and/or some other examples herein, wherein for guard band/guard band scenarios, the non-anchor carrier is always a symmetric guard band carrier on the other side of system BW, with respect to anchor carrier, and N bits are used to indicate which guard band carrier is used for the anchor carrier, where N is an integer.

Example 69 may include the subject matter of Example 68 and/or some other examples herein, wherein values of N equal to 0, 1, 2, and 3 bits respectively, correspond to a system bandwidth (BW) of 5, 10, 15 and 20 MHz, respectively.

Example 70 may include the subject matter of Example 59 and/or some other examples herein, wherein for in-band anchor scenarios, one or more reserved bits in an MIB-NB are used for indication of the SIB1-NB signal.

Example 71 may include the subject matter of Example 59 and/or some other examples herein, wherein for guard band anchor scenarios, one or more of 3 spare bits in a 5-bit field for a raster offset indication or one or more reserved bits in MIB-NB are used for indication of the SIB1-NB signal.

Example 72 may include the subject matter of Example 59 and/or some other examples herein, wherein for standalone/standalone scenarios, one or more of 5 spare bits in a 5-bit field for raster offset indication are used for indication of the SIB1-NB signal.

Example 73 may include the subject matter of any one of Examples 59-72 and/or some other examples herein, wherein the apparatus is a user equipment (UE) or a portion or implementation thereof.

Example 74 may include a method that includes: constructing or causing to construct a narrowband system information block 1 (SIB1-NB) signal for transmission; and transmitting or causing to transmit the SIB1-NB signal on a non-anchor carrier for time division duplexed (TDD) narrowband internet-of-things (NB-IoT).

Example 75 may include the subject matter of Example 74 and/or some other examples herein, wherein the SIB1-NB transmission on the non-anchor carrier is supported in all multi-carrier operations supported in TDD NB-IoT.

Example 76 may include the subject matter of Example 74 and/or some other examples herein, wherein the SIB1-NB transmission on the non-anchor carrier is supported in one or more of in-band/in-band, standalone/standalone, guard band/in-band, or guard band/guard band multi-carrier operations supported in TDD NB-IoT.

Example 77 may include the subject matter of Example 76 and/or some other examples herein, wherein the SIB1-NB transmission on the non-anchor carrier is supported for one or more guard band anchor/in-band non-anchor carrier operations.

Example 78 may include the subject matter of Example 74 and/or some other examples herein, wherein one bit in a narrowband master information block (MIB-NB) is used to indicate whether the SIB1-NB transmission is transmitted on an anchor carrier or the non-anchor carrier.

Example 79 may include the subject matter of Example 74 and/or some other examples herein, wherein for in-band/in-band and standalone/standalone scenarios, N bits are used in an MIB-NB to indicate the offset of the non-anchor carrier with SIB1-NB from the anchor carrier, where N is an integer.

Example 80 may include the subject matter of Example 79 and/or some other examples herein, wherein N is equal to 1 to indicate one out of the two neighboring carriers of the anchor carrier.

Example 81 may include the subject matter of Example 74 and/or some other examples herein, wherein for in-band/guard band scenarios, a plurality of in-band and guard band carriers are predefined, and N bits in an MIB-NB are used to indicate one of the predefined carriers, where N is an integer.

Example 82 may include the subject matter of Example 74 and/or some other examples herein, wherein for in-band/guard band or guard band/guard band scenarios, 2 bits are used in an MIB-NB to indicate the system bandwidth (BW) from candidate set {5, 10, 15, 20} megahertz (MHz).

Example 83 may include the subject matter of Example 74 and/or some other examples herein, wherein for guard band/guard band scenarios, the non-anchor carrier is always a symmetric guard band carrier on the other side of system BW, with respect to anchor carrier, and N bits are used to indicate which guard band carrier is used for the anchor carrier, where N is an integer.

Example 84 may include the subject matter of Example 83 and/or some other examples herein, wherein values of N equal to 0, 1, 2, and 3 bits respectively, correspond to a system bandwidth (BW) of 5, 10, 15 and 20 MHz, respectively.

Example 85 may include the subject matter of Example 74 and/or some other examples herein, wherein for in-band anchor scenarios, one or more reserved bits in an MIB-NB are used for indication of the SIB1-NB signal.

Example 86 may include the subject matter of Example 74 and/or some other examples herein, wherein for guard band anchor scenarios, one or more of 3 spare bits in a 5-bit field for a raster offset indication or one or more reserved bits in MIB-NB are used for indication of the SIB1-NB signal.

Example 87 may include the subject matter of Example 74 and/or some other examples herein, wherein for standalone/standalone scenarios, one or more of 5 spare bits in a 5-bit field for raster offset indication are used for indication of the SIB1-NB signal.

Example 88 may include the subject matter of any one of Examples 74-87 and/or some other examples herein, wherein the method is performed by an evolved NodeB (eNB), a next generation NodeB (gNB), or a portion or implementation thereof.

Example 89 may include a method that includes: receiving or causing to receive a narrowband system information block 1 (SIB1-NB) signal on a non-anchor carrier for time division duplexed (TDD) narrowband internet-of-things (NB-IoT); and constructing or causing to construct a signal for transmission based at least in part on the SIB1-NB signal.

Example 90 may include the subject matter of Example 89 and/or some other examples herein, wherein the SIB1-NB signal on the non-anchor carrier is supported in all multi-carrier operations supported in TDD NB-IoT.

Example 91 may include the subject matter of Example 89 and/or some other examples herein, wherein the SIB1-NB signal on the non-anchor carrier is supported in one or more of in-band/in-band, standalone/standalone, guard band/in-band, or guard band/guard band multi-carrier operations supported in TDD NB-IoT.

Example 92 may include the subject matter of Example 91 and/or some other examples herein, wherein the SIB1-NB signal on the non-anchor carrier is supported for one or more guard band anchor/in-band non-anchor carrier operations.

Example 93 may include the subject matter of Example 89 and/or some other examples herein, wherein one bit in a narrowband master information block (MIB-NB) is used to indicate whether the SIB1-NB signal is transmitted on an anchor carrier or the non-anchor carrier.

Example 94 may include the subject matter of Example 89 and/or some other examples herein, wherein for in-band/in-band and standalone/standalone scenarios, N bits are used in an MIB-NB to indicate the offset of the non-anchor carrier with SIB1-NB from the anchor carrier, where N is an integer.

Example 95 may include the subject matter of Example 94 and/or some other examples herein, wherein N is equal to 1 to indicate one out of the two neighboring carriers of the anchor carrier.

Example 96 may include the subject matter of Example 89 and/or some other examples herein, wherein for in-band/guard band scenarios, a plurality of in-band and guard band carriers are predefined, and N bits in an MIB-NB are used to indicate one of the predefined carriers, where N is an integer.

Example 97 may include the subject matter of Example 89 and/or some other examples herein, wherein for in-band/guard band or guard band/guard band scenarios, 2 bits are used in an MIB-NB to indicate the system bandwidth (BW) from candidate set {5, 10, 15, 20} megahertz (MHz).

Example 98 may include the subject matter of Example 89 and/or some other examples herein, wherein for guard band/guard band scenarios, the non-anchor carrier is always a symmetric guard band carrier on the other side of system BW, with respect to an anchor carrier, and N bits are used to indicate which guard band carrier is used for the anchor carrier, where N is an integer.

Example 99 may include the subject matter of Example 98 and/or some other examples herein, wherein values of N equal to 0, 1, 2, and 3 bits respectively, correspond to a system bandwidth (BW) of 5, 10, 15 and 20 MHz, respectively.

Example 100 may include the subject matter of Example 89 and/or some other examples herein, wherein for in-band anchor scenarios, one or more reserved bits in an MIB-NB are used for indication of the SIB1-NB signal.

Example 101 may include the subject matter of Example 89 and/or some other examples herein, wherein for guard band anchor scenarios, one or more of 3 spare bits in a 5-bit field for a raster offset indication or one or more reserved bits in MIB-NB are used for indication of the SIB1-NB signal.

Example 102 may include the subject matter of Example 89 and/or some other examples herein, wherein for standalone/standalone scenarios, one or more of 5 spare bits in a 5-bit field for raster offset indication are used for indication of the SIB1-NB signal.

Example 103 may include the subject matter of any one of Examples 89-102 and/or some other examples herein, wherein the apparatus is a user equipment (UE) or a portion or implementation thereof.

Example 104 may include an apparatus comprising means to perform one or more elements of a method described in or related to any of examples 1-103 and 114, or any other method or process described herein.

Example 105 may include one or more non-transitory computer-readable media comprising instructions to cause an electronic device, upon execution of the instructions by one or more processors of the electronic device, to perform one or more elements of a method described in or related to any of examples 1-103 and 114, or any other method or process described herein.

Example 106 may include an apparatus comprising logic, modules, or circuitry to perform one or more elements of a method described in or related to any of examples 1-103 and 114, or any other method or process described herein.

Example 107 may include a method, technique, or process as described in or related to any of examples 1-103 and 114, or portions or parts thereof.

Example 108 may include an apparatus comprising: one or more processors and one or more computer readable media comprising instructions that, when executed by the one or more processors, cause the one or more processors to perform the method, techniques, or process as described in or related to any of examples 1-103 and 114, or portions thereof.

Example 109 may include a signal as described in or related to any of examples 1-103 and 114, or portions or parts thereof.

Example 110 may include a signal in a wireless network as shown and described herein.

Example 111 may include a method of communicating in a wireless network as shown and described herein.

Example 112 may include a system for providing wireless communication as shown and described herein.

Example 113 may include a device for providing wireless communication as shown and described herein.

Example 114 may include the subject matter of example 1 or some other example herein, wherein for the guard-band anchor carrier case, 1 bit out of the 3 spare bits in the 5-bit field for indication of raster offset can be used to indicate a number of CRS ports for a differentPCI case and to indicate a system BW for a samePCI case, and/or another 1 bit out of this field can be used to indicate whether it is samePCI or differentPCI case.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

The invention claimed is:

1. One or more non-transitory computer-readable storage media including computer executable instructions for supporting time division duplexing (TDD) in a narrowband internet-of-things (NB-IoT) system, wherein the instructions, when executed by one or more processors, cause the one or more processors to:
receive a narrowband master information block (MIB-NB);
determine, based on a first bit set of the MIB-NB, information that includes a system bandwidth information value;
determine, based on the system bandwidth value, a second bit set of the MIB-NB;
determine, based on the second bit set of the MIB-NB, a frequency location of a non-anchor carrier; and
receive a narrowband system information block type 1 (SIB1-NB) on the non-anchor carrier.

2. The non-transitory computer-readable storage medium of claim 1, wherein the information is to indicate that the non-anchor carrier is operating in guard band mode, in-band mode, or standalone mode.

3. The non-transitory computer-readable storage medium of claim 2, further comprising instructions that when executed by the one or more processors cause the one or more processors to:
receive additional system information block (SIB) information on an anchor carrier, the non-anchor carrier, or another non-anchor carrier, wherein the anchor carrier is operating in guard band mode, in-band mode, or standalone mode and wherein the other non-anchor carrier is operating in guard band mode, in-band mode, or standalone mode.

4. The non-transitory computer-readable storage medium of claim 3, wherein the information is to indicate that the non-anchor carrier is adjacent to the anchor carrier.

5. The non-transitory computer-readable storage medium of claim 3, wherein:
N bits of the MIB-NB indicate that the non-anchor carrier is operating in guard band mode or in-band mode; and
N is an integer.

6. The non-transitory computer-readable storage medium of claim 5, wherein the N bits of the MIB-NB further indicate a system bandwidth (BW) that is associated with the anchor carrier and the non-anchor carrier.

7. The non-transitory computer-readable storage medium of claim 6, wherein one bit out of the N bits is used to identify the system BW as 5 or 15 MHz when the system BW is an odd system bandwidth or as 10 or 20 MHz when the system BW is an even system bandwidth.

8. The non-transitory computer-readable storage medium of claim 3, wherein:

N bits of the MIB-NB indicate which one of multiple standalone carriers is the non-anchor carrier, and N is an integer.

9. One or more non-transitory computer-readable storage media including computer executable instructions for supporting time division duplexing (TDD) in a narrowband internet-of-things (NB-IoT) system, wherein the instructions, when executed by one or more processors, cause the one or more processors to:

receive a narrowband master information block (MIB-NB);

determine, based on a first bit set of the MIB-NB, a system bandwidth value;

determine, based on the system bandwidth value, a second bit set of the MIB-NB;

determine, based on the MIB-NB, that a narrowband system information block type 1 (SIB I-NB) is to be transported on an anchor carrier or a non-anchor carrier;

in response to determining that the SIB1-NB is to be transported on a non-anchor carrier, identify, based at least on the second bit set of the MIB-NB, a frequency location of the non-anchor carrier that transports the SIB1-NB; and receive the SIB1-NB on the identified non-anchor carrier.

10. The non-transitory computer-readable storage medium of claim 9, wherein each of the anchor carrier and the non-anchor carrier is operating in guard band mode, in-band mode, or standalone mode.

11. An apparatus for use in supporting time division duplexing (TDD) in a narrowband internet-of-things (NB-IoT) system, the apparatus comprising:

memory circuitry; and processing circuitry, coupled with the memory circuitry, to receive a narrowband master information block (MIB-NB);

determine, based on a first bit set of the MIB-NB, information that includes a system bandwidth value;

store the information in the memory circuitry;

determine, based on the system bandwidth value, a second bit set of the MIB-NB;

determine, based on the second bit set of the MIB-NB, a frequency location of a non-anchor carrier; and receive a narrowband system information block type 1 (SIB1-NB) on the non-anchor carrier.

12. The apparatus of claim 11, wherein the information indicates that the non-anchor carrier is operating in guard band mode, in-band mode, or standalone mode.

13. The apparatus of claim 12, further configured to:

receive, by the processing circuitry, additional system information block (SIB) information on an anchor carrier, the non-anchor carrier, or another non-anchor carrier, wherein the anchor carrier is operating in guard band mode, in-band mode, or standalone mode and wherein the other non-anchor carrier is operating in guard band mode, in-band mode, or standalone mode.

14. The apparatus of claim 13, wherein the information is to indicate that the non-anchor carrier is adjacent to the anchor carrier.

15. The apparatus of claim 13, wherein:

N bits of the MIB-NB indicate that the non-anchor carrier is operating in guard band mode or in-band mode; and N is an integer.

16. The apparatus of claim 15, wherein the N bits of the MIB-NB further indicate a system bandwidth (BW) that is associated with the anchor carrier and the non-anchor carrier.

17. The apparatus of claim 16, wherein one bit out of the N bits is used to identify the system BW as 5 or 15 MHz when the system BW is an odd system bandwidth or as 10 or 20 MHz when the system BW is an even system bandwidth.

18. The apparatus of claim 13, wherein:

N bits of the MIB-NB indicate which one of multiple standalone carriers is the non-anchor carrier; and N is an integer.

19. An apparatus for use in supporting time division duplexing (TDD) in a narrowband internet-of-things (NB-IoT) system, the apparatus comprising:

memory circuitry; and processing circuitry, coupled with the memory circuitry, to transmit a narrowband master information block (MB-NB), the MIB-NB including information; and transmit a narrowband system information block type 1 (SIB1-NB) on a non-anchor carrier, wherein the information corresponds to a first bit set of the MIB-NB and includes a system bandwidth value, and wherein the system bandwidth value corresponds to a second bit set of the MIB-NB that indicates a frequency location of the non-anchor carrier.

20. The apparatus of claim 19, wherein the information indicates that the non-anchor carrier is operating in guard band mode, in-band mode, or standalone mode.

21. The apparatus of claim 20, wherein the processing circuitry is further configured to:

transmit additional system information block (SIB) information on an anchor carrier, the non-anchor carrier, or another non-anchor carrier, wherein the anchor carrier is operating in guard band mode, in-band mode, or standalone mode and wherein the other non-anchor carrier is operating in guard band mode, in-band mode, or standalone mode.

22. The apparatus of claim 21, wherein the information is to indicate that the non-anchor carrier is adjacent to the anchor carrier.

23. The apparatus of claim 21, wherein:

N bits of the MIB-NB indicate that the non-anchor carrier is operating in guard band mode or in-band mode; and N is an integer.

24. The apparatus of claim 23, wherein:

the N bits of the MIB-NB further indicate a system bandwidth (BW) that is associated with the anchor carrier and the non-anchor carrier.

25. The apparatus of claim 24, wherein one bit out of the N bits is used to identify the system BW as 5 or 15 MHz when the system BW is an odd system bandwidth or as 10 or 20 MHz when the system BW is an even system bandwidth.

* * * * *

UNITED STATES PATENT AND TRADEMARK OFFICE
CERTIFICATE OF CORRECTION

PATENT NO. : 11,552,774 B2
APPLICATION NO. : 16/273566
DATED : January 10, 2023
INVENTOR(S) : Qiaoyang Ye et al.

It is certified that error appears in the above-identified patent and that said Letters Patent is hereby corrected as shown below:

In the Claims

Claim 1, Column 60, Line 26, "system bandwidth information" should read --system bandwidth--.

Signed and Sealed this
Twenty-fifth Day of July, 2023

Katherine Kelly Vidal
*Director of the United States Patent and Trademark Office*